United States Patent
Shiga et al.

(10) Patent No.: US 9,598,522 B2
(45) Date of Patent: Mar. 21, 2017

(54) RESIN COMPOSITION FOR GOLF BALL AND GOLF BALL

(71) Applicant: DUNLOP SPORTS CO. LTD., Kobe-shi, Hyogo (JP)

(72) Inventors: Kazuyoshi Shiga, Kobe (JP); Masanori Taguchi, Kobe (JP); Takahiro Shigemitsu, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 0 days.

(21) Appl. No.: 14/582,752

(22) Filed: Dec. 24, 2014

(65) Prior Publication Data

US 2015/0183916 A1 Jul. 2, 2015

(30) Foreign Application Priority Data

Dec. 26, 2013 (JP) .................. 2013-269758
May 30, 2014 (JP) .................. 2014-113409

(51) Int. Cl.

| | |
|---|---|
| A63B 37/00 | (2006.01) |
| C08F 8/44 | (2006.01) |
| C08F 8/46 | (2006.01) |
| C08F 279/02 | (2006.01) |
| C08L 51/04 | (2006.01) |
| C08L 23/08 | (2006.01) |
| C08F 290/04 | (2006.01) |
| C08L 13/00 | (2006.01) |

(52) U.S. Cl.
CPC ........ *C08F 279/02* (2013.01); *A63B 37/0003* (2013.01); *A63B 37/0023* (2013.01); *A63B 37/0024* (2013.01); *A63B 37/0039* (2013.01); *A63B 37/0051* (2013.01); *A63B 37/0059* (2013.01); *C08L 51/04* (2013.01); *A63B 37/0007* (2013.01); *A63B 37/0018* (2013.01); *A63B 37/0022* (2013.01); *A63B 37/0074* (2013.01); *A63B 37/0075* (2013.01); *A63B 37/0076* (2013.01); *C08F 8/44* (2013.01); *C08F 8/46* (2013.01); *C08F 290/048* (2013.01); *C08L 13/00* (2013.01); *C08L 23/0876* (2013.01)

(58) Field of Classification Search
None
See application file for complete search history.

(56) References Cited

U.S. PATENT DOCUMENTS

| | | | | |
|---|---|---|---|---|
| 6,489,415 | B2 * | 12/2002 | Hsu ................... | C08F 136/06 526/177 |
| 2006/0030668 | A1 * | 2/2006 | Egashira ............. | A63B 45/00 525/221 |
| 2010/0056303 | A1 * | 3/2010 | Egashira ............ | A63B 37/0051 473/378 |
| 2010/0311884 | A1 * | 12/2010 | Iizuka ................ | C08K 5/09 524/322 |

FOREIGN PATENT DOCUMENTS

| | | | |
|---|---|---|---|
| GB | 1211795 | * | 11/1970 |
| JP | 08103515 | * | 4/1996 |
| JP | 08141112 | * | 6/1996 |

* cited by examiner

*Primary Examiner* — David Buttner
(74) *Attorney, Agent, or Firm* — Birch, Stewart, Kolasch & Birch, LLP

(57) ABSTRACT

The present invention provides resin compositions for golf balls which have excellent flexibility, fluidity, and resilience, and golf balls formed from the resin compositions. The present invention relates to a resin composition for golf balls including a polymer that contains a diene polymer moiety and a carboxylic acid-based moiety wherein carboxyl groups derived from the carboxylic acid-based moiety are neutralized.

2 Claims, No Drawings

RESIN COMPOSITION FOR GOLF BALL AND GOLF BALL

TECHNICAL FIELD

The present invention relates to resin compositions for golf balls and golf balls formed from the resin compositions.

BACKGROUND ART

Materials for golf balls are generally required to provide good performance in terms of shot feeling, flight distance, and productivity, and thus studies to improve flexibility, resilience, and fluidity, which affect these performance properties, are being made.

Ionomers of ethylene/acrylic acid copolymers, composites of polybutadiene rubber and zinc acrylate and the like have been suggested as such materials. Unfortunately, the ionomers have excellent fluidity and high resilience but have poor flexibility, while the composites have excellent flexibility and high resilience but have poor fluidity.

SUMMARY OF INVENTION

Technical Problem

An object of the present invention is to solve the above problems by providing resin compositions for golf balls which have excellent flexibility, fluidity, and resilience, and golf balls formed from the resin compositions.

Solution to Problem

The present invention relates to a resin composition for golf balls, including a polymer that contains a diene polymer moiety and a carboxylic acid-based moiety wherein carboxyl groups derived from the carboxylic acid-based moiety are neutralized.

Preferably, the polymer is obtained by neutralizing carboxyl groups derived from a $C_2$-$C_{18}$ unsaturated carboxylic acid compound contained in a reaction product of the unsaturated carboxylic acid compound and a diene polymer having an $\alpha,\beta$-unsaturated carbonyl group at each end.

Preferably, the diene polymer and the unsaturated carboxylic acid compound are an acryloyl group-containing diene polymer, and acrylic acid and/or a derivative thereof, respectively, or are a methacryloyl group-containing diene polymer, and methacrylic acid and/or a derivative thereof, respectively.

Preferably, the polymer is obtained by neutralizing carboxyl groups derived from a $C_2$-$C_{18}$ unsaturated carboxylic acid compound contained in a reaction product of the unsaturated carboxylic acid compound and a diene polymer having a $C_1$-$C_{18}$ halogenated alkane structure at each end.

Preferably, each end of the diene polymer is bonded to at least one selected from the group consisting of primary to tertiary chloroalkane structures, primary to tertiary bromoalkane structures, and primary to tertiary iodoalkane structures, via at least one selected from the group consisting of an ether bond, a thioether bond, an ester bond, a thioester bond, a silyl ester bond, and a urethane bond.

Preferably, the diene polymer contains a 1,4-cis structure.
Preferably, the unsaturated carboxylic acid compound is at least one selected from the group consisting of acrylic acid, methacrylic acid, and derivatives thereof.
Preferably, the polymer has a content of the unsaturated carboxylic acid compound of B to 50% by mass.

Preferably, the polymer has a degree of neutralization of the carboxyl groups of 20 to 300%.
Preferably, the polymer has a product of the content of the unsaturated carboxylic acid compound and the degree of neutralization of the carboxyl groups of 160 to 4500.
Preferably, the polymer is obtained by neutralizing (anhydrous) dicarboxyl groups contained in a diene polymer that contains an (anhydrous) dicarboxylic acid grafted thereon and has a 1,4-cis structure content of at least 41% by mass.
Preferably, the polymer has a content of the (anhydrous) dicarboxylic acid of 2 to 30% by mass.
Preferably, the polymer has a degree of neutralization of the (anhydrous) dicarboxyl groups of 20 to 300%.
Preferably, the polymer has a product of the content of the (anhydrous) dicarboxylic acid and the degree of neutralization of the (anhydrous) dicarboxyl groups of 80 to 4500.
Preferably, the polymer is obtained by neutralizing carboxyl groups and (anhydrous) dicarboxyl groups contained in a reaction product of a diol compound and a diene polymer containing an (anhydrous) dicarboxylic acid grafted thereon.
Preferably, the diene polymer contains a 1,4-cis structure.
Preferably, the diol compound is at least one selected from the group consisting of $C_2$-$C_{20}$ hydrocarbons having two hydroxy groups, $C_2$-$C_{20}$ hydrocarbons having two hydroxy groups and at least one ether bond, $C_2$-$C_{20}$ hydrocarbons having two hydroxy groups and 1 to 3 carboxyl groups, and high molecular weight hydrocarbons having two hydroxy groups.
Preferably, the reaction product contains 4 to 50% by mass of carboxyl groups and (anhydrous) dicarboxyl groups.
Preferably, the polymer has a degree of neutralization of the carboxyl groups and (anhydrous) dicarboxyl groups of 20 to 300%.
Preferably, the (anhydrous) dicarboxylic acid is at least one selected from the group consisting of (anhydrous) succinic acid, (anhydrous) maleic acid, (anhydrous) glutaric acid, and (anhydrous) adipic acid, and is directly bonded to a main chain and/or an end of the diene polymer.
Preferably, the carboxyl groups are neutralized with at least one metal ion selected from the group consisting of $Na^+$, $Mg^{2+}$, $Ca^{2+}$, and $Zn^{2+}$.

The present invention also relates to a resin composition for golf balls, including: (A) a diene polymer that contains an (anhydrous) dicarboxylic acid grafted thereon and has a 1,4-cis structure content of at least 41% by mass; and (3) at least one selected from the group consisting of: (b-1) a bipolymer of an olefin and a $C_3$-$C_8$ $\alpha,\beta$-unsaturated carboxylic acid, (b-2) a metal ion-neutralized product of a bipolymer of an olefin and a $C_3$-$C_8$ $\alpha,\beta$-unsaturated carboxylic acid, (b-3) a terpolymer of an olefin, a $C_3$-$C_8$ $\alpha,\beta$-unsaturated carboxylic acid, and an $\alpha,\beta$-unsaturated carboxylic acid ester, and (b-4) a metal ion-neutralized product of a terpolymer of an olefin, a $C_3$-$C_8$ $\alpha,\beta$-unsaturated carboxylic acid, and an $\alpha,\beta$-unsaturated carboxylic acid ester.

Preferably, the (anhydrous) dicarboxylic acid of the component (A) is at least one selected from the group consisting of (anhydrous) succinic acid, (anhydrous) maleic acid, (anhydrous) glutaric acid, and (anhydrous) adipic acid, and is directly bonded to a main chain and/or an end of the diene polymer.
Preferably, the diene polymer (A) has a content of the (anhydrous) dicarboxylic acid of at least 1% by mass.
Preferably, the resin composition contains 1 to 70 parts by mass of the component (A) for each 100 parts by mass of the component (B).

Preferably, the α,β-unsaturated carboxylic acid of the component (B) is at least one selected from the group consisting of acrylic acid, methacrylic acid, and (anhydrous) maleic acid.

Preferably, the component (B) has a content of the α,β-unsaturated carboxylic acid of 4 to 50% by mass.

Preferably, in the case of any of the metal ion-neutralized products, the component (B) has a degree of neutralization of 50 to 500%.

Preferably, in the case of any of the metal ion-neutralized products, the component (B) has a product of the content of the α,β-unsaturated carboxylic acid and the degree of neutralization of 750 to 5500.

Preferably, the resin composition further includes (C) at least one metal ion selected from the group consisting of $Na^+$, $Mg^{2+}$, $Ca^{2+}$, and $Zn^{2+}$.

The present invention also relates to a golf ball formed from the resin composition for golf balls.

Advantageous Effects of Invention

The present invention provides a resin composition for golf balls, including a polymer that contains a diene polymer moiety and a carboxylic acid-based moiety wherein carboxyl groups derived from the carboxylic acid-based moiety are neutralized. Thus, the present invention can provide excellent flexibility, fluidity, and resilience. The present invention also provides a resin composition for golf balls, including (A) a diene polymer that contains an (anhydrous) dicarboxylic acid grafted thereon and has a 1,4-cis structure content of at least 41% by mass, and (B) at least one selected from the group consisting of (b-1) a bipolymer of an olefin and a $C_3$-$C_8$ α,β-unsaturated carboxylic acid, (b-2) a metal ion-neutralized product of a bipolymer of an olefin and a $C_3$-$C_8$ α,β-unsaturated carboxylic acid, (b-3) a terpolymer of an olefin, a $C_3$-$C_8$ α,β-unsaturated carboxylic acid, and an α,β-unsaturated carboxylic acid ester, and (b-4) a metal ion-neutralized product of a terpolymer of an olefin, a $C_5$-$C_8$ α,β-unsaturated carboxylic acid, and an α,β-unsaturated carboxylic acid ester. Thus, the present invention can provide excellent flexibility, fluidity, and resilience.

DESCRIPTION OF EMBODIMENTS

First Resin Composition for Golf Balls

The first resin composition for golf balls according to the present invention includes a polymer that contains a diene polymer moiety and a carboxylic acid-based moiety wherein carboxyl groups derived from the carboxylic acid-based moiety are neutralized.

Good flexibility, fluidity, and resilience can be achieved by using such a polymer, for example, a polymer containing a polymer moiety derived from a diene monomer such as butadiene (i.e., diene polymer moiety) and a moiety derived from a carboxylic acid compound capable of generating a carboxyl group (i.e., carboxylic acid-based moiety), such as unsaturated carboxylic acids, (anhydrous) dicarboxylic acids, and derivatives thereof (e.g. esters).

The first resin composition for golf balls according to the present invention is not particularly limited as long as the composition contains the above polymer. Examples of preferred embodiments thereof include: a resin composition for golf balls including a polymer obtained by neutralizing carboxyl groups derived from a $C_2$-$C_{18}$ unsaturated carboxylic acid compound contained in a reaction product of the unsaturated carboxylic acid compound and a diene polymer having an α,β-unsaturated carbonyl group at each end (hereinafter, referred to as the first resin composition 1 for golf balls); a resin composition for golf balls including a polymer obtained by neutralizing carboxyl groups derived from a $C_2$-$C_{18}$ unsaturated carboxylic acid compound contained in a reaction product of the unsaturated carboxylic acid compound and a diene polymer having a $C_1$-$C_{18}$ halogenated alkane structure at each end (hereinafter, referred to as the first resin composition 2 for golf balls); a resin composition for golf balls including a polymer obtained by neutralizing (anhydrous) dicarboxyl groups contained in a diene polymer that contains an (anhydrous) dicarboxylic acid grafted thereon and has a 1,4-cis structure content of at least 41% by mass (hereinafter, referred to as the first resin composition 3 for golf balls); and a resin composition for golf balls including a polymer obtained by neutralizing carboxyl groups and (anhydrous) dicarboxyl groups contained in a reaction product of a dial compound and a diene polymer containing an (anhydrous) dicarboxylic acid grafted thereon (hereinafter, referred to as the first resin composition 4 far golf balls).

(First Resin Composition 1 for Golf Balls)

The first resin composition 1 for golf balls includes a polymer obtained by neutralizing carboxyl groups derived from a $C_2$-$C_{18}$ unsaturated carboxylic acid compound contained in a reaction product of the unsaturated carboxylic acid compound and a diene polymer having an α,β-unsaturated carbonyl group at each end.

Here, the "resin composition for golf balls including a polymer obtained by neutralizing carboxyl groups derived from a $C_2$-$C_{18}$ unsaturated carboxylic acid compound contained in a reaction product of the unsaturated carboxylic acid compound and a diene polymer having an α,β-unsaturated carbonyl group at each end" means, if the unsaturated carboxylic acid compound is an unsaturated carboxylic acid, one obtained by neutralizing carboxyl groups present in a reaction product of the diene polymer and the unsaturated carboxylic acid (i.e., carboxyl groups in the unsaturated carboxylic acid units). Also, if the unsaturated carboxylic acid compound is an unsaturated carboxylic acid derivative such as an unsaturated carboxylic acid ester, it means one obtained by neutralizing carboxyl groups generated from the unsaturated carboxylic acid derivative units present in a reaction product of the diene polymer and the unsaturated carboxylic acid derivative (e.g., if the unsaturated carboxylic acid derivative is t-butyl acrylate, one obtained by neutralizing carboxyl groups generated by eliminating t-butyl groups from the t-butyl acrylate units in the reaction product).

A diene polymer constituting the skeleton of the diene polymer having an α,β-unsaturated carbonyl group at each end is a polymer of a diene. The diene is a compound having two double bonds within the molecule, and is preferably a conjugated diene. Examples of the dienes include 1,2-propadiene, 1,2-butadiene, 1,3-butadiene, 2-methyl-1,3-butadiene (isoprene), 2,3-dimethyl-1,3-butadiene, 1,2-pentadiene, 1,3-pentadiene, 1,4-pentadiene, 1,2-hexadiene, 1,3-hexadiene, 1,4-hexadiene, and 1,5-hexadiene. Preferred among these are 1,3-butadiene and 2,3-dimethyl-1,3-butadiene (isoprene).

The diene polymer constituting the skeleton of the diene polymer having an α,β-unsaturated carbonyl group at each end has a number average molecular weight of 500 to 10000, preferably 1000 to 5000.

The number average molecular weight herein can be determined by gel permeation chromatography (GPC) relative to polystyrene standards.

Moreover, the diene polymer constituting the skeleton preferably contains a 1,4-cis structure, and the diene polymer more preferably has a cis content (1,4-cis structure content) of at least 10% by mass, still more preferably at least 20% by mass. When the cis content is at least 10% by mass, good resilience can be achieved.

Examples of the α,β-unsaturated carbonyl groups include, but not limited to, (meth)acryloyl groups and α,β-unsaturated amide groups. (Meth)acryloyl groups are preferred among these from the viewpoints of flexibility, fluidity, and resilience. The α,β-unsaturated carbonyl groups present at the respective ends may be the same as or different from each other, but are preferably the same as each other.

An α,β-unsaturated carbonyl group-containing compound capable of introducing an α,β-unsaturated carbonyl group into each end of the diene polymer may be a mono- or poly-functional compound. Specific examples thereof include t-butyl (meth)acrylate, 2-hydroxy-1,3-dimethacryloxypropane, methylenebisacrylamide, (meth)acrylamide, (meth)acrylic acid, anhydrous (meth)acrylic acid, (meth)acrylic acid chloride, (meth)acrylic acid bromide, vinyl imidazole ketone, 1-(1-methylvinyl) imidazole ketone, and 2-isocyanatoethyl acrylate. (Meth)acrylic acid chloride and (meth)acrylic acid bromide are preferred among these from the viewpoints of flexibility, fluidity, and resilience.

The diene polymer having an α,β-unsaturated carbonyl group at each end can be prepared by a conventionally known method, such as by reacting a diene polymer having at each end a functional group reactive to an α,β-unsaturated carbonyl group-containing compound, with the compound. More specifically, such a diene polymer can be prepared by reacting a diene polymer having a hydroxy group at each end and an α,β-unsaturated carbonyl group-containing compound (e.g. (meth)acrylic acid chloride and (meth)acrylic acid bromide) by a known method.

A $C_2$-$C_{19}$ unsaturated carboxylic acid compound is used for the polymer in the resin composition 1 for golf balls. The "unsaturated carboxylic acid compound" herein refers to a compound having at least one double bond and a carboxyl group or its derivative group (e.g. carboxylic acid ester group) within the molecule. The number of carbons in the unsaturated carboxylic acid compound is preferably 3 to B.

Examples of the unsaturated carboxylic acid compounds include unsaturated carboxylic acids and derivatives thereof (e.g. unsaturated carboxylic acid esters). Specific examples thereof include acrylic acid, methacrylic acid, fumaric acid, maleic acid, crotonic acid (trans-2-butenoic acid), isocrotonic acid (cis-2-butenoic acid), sorbic acid, citraconic acid, and mesaconic acid; and derivatives thereof (e.g. esters). Acrylic acid, methacrylic acid, and derivatives thereof (e.g. esters such as t-butyl acrylate) are preferred among these from the viewpoints of flexibility, fluidity, and resilience.

The following are especially preferred from the viewpoint of increasing the reactivity between the diene polymer and the unsaturated carboxylic acid compound and significantly improving flexibility, fluidity, and resilience: (1) a resin composition obtained using an acryloyl group-containing diene polymer as the diene polymer, and acrylic acid and/or a derivative thereof (e.g. acrylic acid esters) as the unsaturated carboxylic acid compound; and (2) a resin composition obtained using a methacryloyl group-containing diene polymer as the diene polymer and methacrylic acid and/or a derivative thereof (e.g. methacrylic acid esters) as the unsaturated carboxylic acid compound.

The polymer in the resin composition 1 for golf balls can be obtained by reacting (copolymerizing) the diene polymer and the unsaturated carboxylic acid compound by a known method, and neutralizing carboxyl groups contained in the resulting reaction product or carboxyl groups derived from the unsaturated carboxylic acid compound that are generated from the reaction product.

For example, the polymer may be prepared by mixing a diene polymer (e.g. polybutadiene) having an α,β-unsaturated carbonyl group (e.g. an acrylate group) at each end and t-butyl acrylate in a predetermined ratio, copolymerizing them in the presence of, for example, a polymerization initiator and a catalyst, and then eliminating the t-butyl protective groups to give a predetermined butadiene/acrylic acid copolymer having carboxyl groups, and subsequently neutralizing the carboxyl groups with an inorganic metal compound. The polymerization method is preferably a living radical polymerization method, particularly preferably an atom transfer radical polymerization method (ATRP). Moreover, carboxyl groups can be neutralized by, specifically, melting the above reaction product or a product obtained by generating carboxyl groups derived from the unsaturated carboxylic acid compound from the reaction product, adding a predetermined amount of an inorganic metal compound to the melt, and kneading the mixture.

The inorganic compound may be any inorganic compound capable of neutralizing carboxyl groups, and examples thereof include compounds containing, for example, Na, Mg, Ca, and Zn. In particular, compounds containing Na, Mg, Ca, and Zn are preferred; in this case, carboxyl groups will be neutralized by the metal ions $Na^+$, $Mg^{2+}$, $Ca^{2+}$, and $Zn^{2+}$, respectively.

The content of the unsaturated carboxylic acid compound based on 100% by mass of the polymer is preferably at least 8% by mass, more preferably at least 10% by mass, and still more preferably at least 15% by mass. The content is also preferably at most 50% by mass, more preferably at most 30% by mass, and still more preferably at most 25% by mass. When the content of the unsaturated carboxylic acid compound is adjusted within the range mentioned above, good resilience can be achieved.

From the viewpoint of the effect of the present invention, the ratio between the content of the diene polymer and the content of the unsaturated carboxylic acid compound (diene polymer/unsaturated carboxylic acid compound (by mass)) in the polymer is preferably 1/1 to 1/0.087, and more preferably 1/0.429 to 1/0.111.

The degree of neutralization of the carboxyl groups in the polymer is preferably at least 20%, more preferably at least 50%, and still more preferably at least 80%, while it is preferably at most 300%, more preferably at most 200%, and still more preferably at most 100%. When the degree of neutralization is adjusted within the range mentioned above, good resilience can be achieved.

The degree of neutralization of carboxyl groups herein refers to the ratio of the number of moles of neutralized carboxyl groups to the total number of moles of carboxyl groups contained in the polymer.

The degree of neutralization is calculated using the amounts of materials introduced although it can alternatively be calculated from the following formula using the number of moles of non-neutralized carboxyl groups ([COOH]) derived from the unsaturated carboxylic acid in the polymer, which is determined for example by heat-dissolving the polymer in tetrahydrofuran, and titrating the solution with potassium hydroxide having a specified concentration under heating, and the number of moles of neutralized carboxyl groups ([COOM]) calculated by metal analysis.

Degree of neutralization(mol %)=[COOM]/
([COOH]+[COOM])×100

The metal analysis may be performed with, for example, the Polarized Zeeman Atomic Absorption Spectrophotometer 180-80 from Hitachi, Ltd. in the case of monovalent metals such as sodium, or with, for example, a sequential ICP emission spectrophotometer SPS 1100 from Seiko Instruments Inc. in the case of divalent metals such as zinc.

The product (mass %×%) of the content of the unsaturated carboxylic acid compound based on 100% by mass of the polymer and the degree of neutralization of the carboxyl groups is preferably 160 to 4500, more preferably 300 to 3000, and still more preferably 1200 to 1500. The effect of the present invention can be sufficiently achieved when the product falls within the range mentioned above.

(First Resin Composition 2 for Golf Balls)

The first resin composition 2 for golf balls includes a polymer obtained by neutralizing carboxyl groups derived from a $C_2$-$C_{18}$ unsaturated carboxylic acid compound contained in a reaction product of the unsaturated carboxylic acid compound and a diene polymer having a $C_1$-$C_{18}$ halogenated alkane structure at each end.

Here, the "resin composition for golf balls including a polymer obtained by neutralizing carboxyl groups derived from a $C_2$-$C_{18}$ unsaturated carboxylic acid compound contained in a reaction product of the unsaturated carboxylic acid compound and a diene polymer having a $C_1$-$C_{18}$ halogenated alkane structure at each end" means, if the unsaturated carboxylic acid compound is an unsaturated carboxylic acid, one obtained by neutralizing carboxyl groups present in a reaction product of the diene polymer and the unsaturated carboxylic acid (i.e., carboxyl groups in the unsaturated carboxylic acid units). Also, if the unsaturated carboxylic acid compound is an unsaturated carboxylic acid derivative such as an unsaturated carboxylic acid ester, it means one obtained by neutralizing carboxyl groups generated from the unsaturated carboxylic acid derivative units present in a reaction product of the diene polymer and the unsaturated carboxylic acid derivative (e.g., if the unsaturated carboxylic acid derivative is t-butyl acrylate, one obtained by neutralizing carboxyl groups generated by eliminating t-butyl groups from the t-butyl acrylate units in the reaction product).

A diene polymer constituting the skeleton of the diene polymer having a $C_1$-$C_{18}$ halogenated alkane structure at each end is a polymer of a diene, and is as mentioned above.

The diene polymer constituting the skeleton of the diene polymer having a $C_1$-$C_{18}$ halogenated alkane structure at each end has a number average molecular weight of 500 to 10000, preferably 1000 to 5000.

Moreover, the diene polymer constituting the skeleton preferably contains a 1,4-cis structure, and the diene polymer more preferably has a cis content (1,4-cis structure content) of at least 10% by mass, still more preferably at least 20% by mass. When the cis content is at least 10% by mass, good resilience can be achieved.

Examples of the $C_1$-$C_{18}$ halogenated alkane structures include, but not limited to, primary to tertiary chloroalkane structures, primary to tertiary bromoalkane structures, and primary to tertiary iodoalkane structures. Tertiary bromoalkane structures are preferred among these from the viewpoints of flexibility, fluidity, and resilience. The halogenated alkane structures present at the respective ends may be the same as or different from each other, but are preferably the same as each other.

A halogenated alkane structure-containing compound capable of introducing a $C_1$-$C_{18}$ haloganated alkane structure into each end of the diene polymer may be bromoisobutyric acid bromide, bromoisobutyric acid, anhydrous bromoisobutyric acid, bromoisobutyric acid imidazole, 1-bromo-3-chloropropane, 2-chloro-2-methylethyl isocyanate, chloro(2-bromo-2-methylpropyl)dimethylsilane or the like. In particular, bromoisobutyric acid bromide is preferred from the viewpoints of flexibility, fluidity, and resilience.

The diene polymer having a $C_1$-$C_{18}$ halogenated alkane structure at each end can be prepared by a conventionally known method, such as by reacting a diene polymer having at each end a functional group reactive to a halogenated alkane structure-containing compound, with the compound. More specifically, such a diene polymer can be prepared by reacting a diene polymer having a hydroxy group at each end and a halogenated alkane structure-containing compound (e.g. bromoisobutyric acid bromide) by a known method.

In the thus prepared diene polymer having a $C_1$-$C_{18}$ halogenated alkane structure at each end, each end of the diene polymer is preferably bonded to at least one selected from the group consisting of primary to tertiary chloroalkane structures, primary to tertiary bromoalkane structures, and primary to tertiary iodoalkane structures, via at least one selected from the group consisting of an ether bond, a thioether bond, an ester bond, a thioester bond, a silyl ester bond, and a urethane bond.

For example, a diene polymer having a hydroxy group at each end may be bonded to a tertiary bromoalkane structure via an ester bond by reacting the diene polymer with bromoisobutyric acid bromide, bromoisobutyric acid, anhydrous bromoisobutyric acid, or bromoisobutyric acid imidazole by a known method. In order to bond the diene polymer to a halogenated alkane structure via an ester bond, the diene polymer may also be reacted with the following compounds, other than the bromoisobutyric acid bromide, bromoisobutyric acid, anhydrous bromoisobutyric acid, and bromoisobutyric acid imidazole: chloroacetic acid, anhydrous chloroacetic acid, chloroacetic acid chloride, chloroacetic acid imidazole, bromoacetic acid, anhydrous bromoacetic acid, bromoacetic acid bromide, bromoacetic acid imidazole, iodoacetic acid, anhydrous iodoacetic acid, iodoacetic acid iodide, iodoacetic acid imidazole, chloro 1-propanoic acid, anhydrous chloro-1-propanoic acid, chloro-1-propanoic acid chloride, chloro-1-propanoic acid imidazole, chloro-2-propanoic acid, anhydrous chloro-2-propanoic acid, chloro-2-propanoic acid chloride, chloro-2-propanoic acid imidazole, bromo-1-propanoic acid, anhydrous bromo-1-propanoic acid, bromo-1-propanoic acid bromide, bromo-1-propanonic acid imidazole, bromo-2-propanoic acid, anhydrous bromo-2-propanoic acid, bromo-2-propanoic acid bromide, bromo-2-propanoic acid imidazole, iodo-1-propanoic acid, anhydrous iodo-1-propanoic acid, iodo-1-propanoic acid iodide, iodo-1-propanoic acid imidazole, iodo-2-propanoic acid, anhydrous iodo-2-propanoic acid, iodo-2-propanoic acid iodide, iodo-2-propanoic acid imidazole and the like.

Also, the diene polymer having a hydroxy group at each end may be bonded to a primary chloroalkane structure via an ether bond by reacting the diene polymer with 1-bromo-3-chioropropane by a known method. In order to bond the diene polymer to a halogenated alkane structure via an ether band, the diene polymer may also be reacted with the following compounds, other than 1-bromo-3-chloropropane: bromochloroethane, bromoiodoethane, 1-bromo-3-iodopropane, 1-bromo-4-chlorobutane, 1-bromo-4-iodobutane, 1-bromo-3-chlorobutane, 3-bromo-1-iodobutane and the like.

Also, the diene polymer having a hydroxy group at each end may be bonded to a secondary chloroalkane structure via a urethane bond by reacting the diene polymer with 2-chloro-2-methylethyl isocyanate by a known method. In order to bond the diene polymer to a halogenated alkane structure via a urethane bond, the diene polymer may also be reacted with the following compounds, other than 2-chloro-2-methylethyl isocyanate: 2-chloro-2,2-dimethylethyl isocyanate, 2-bromo-2,2-dimethylethyl isocyanate, 2-bromo-2-methylethyl isocyanate, 2-chloroethyl isocyanate, 2-bromoethyl isocyanate and the like.

Also, the diene polymer having a hydroxy group at each end may be bonded to a tertiary bromoalkane structure via a silyl ester bond by reacting the diene polymer with chloro(2-bromo-2-methylpropyl)dimethylsilane by a known method. In order to bond the diene polymer to a halogenated alkane structure via a silyl ester bond, the diene polymer may also be reacted with the following compounds, other than chloro(2-bromo-2-methylpropyl)dimethylsilane: chloro(2-chloro-2-methylpropyl)dimethylsilane, chloro(2-chloropropyl)dimethylsilane, chloro(2-bromopropyl)dimethylsilane, chloro(2-chloroethyl)dimethylsilane, chloro(2-bromoethyl)dimethylsilane and the like.

A $C_2$-$C_{18}$ unsaturated carboxylic acid compound is used for the polymer in the resin composition 2 for golf balls. Suitable examples of the unsaturated carboxylic acid compounds include those described above.

The following are especially preferred from the viewpoint of increasing the reactivity between the diene polymer and the unsaturated carboxylic acid compound and significantly improving flexibility, fluidity, and resilience; (1) a resin composition obtained using a diene polymer having a tertiary bromopropane structure via an ester bond at each end as the diene polymer, and acrylic acid and/or a derivative thereof (e.g. acrylic acid esters) as the unsaturated carboxylic acid compound; and (2) a resin composition obtained using a diene polymer having a tertiary bromopropane structure via an ester bond at each end as the diene polymer, and methacrylic acid and/or a derivative thereof (e.g. methacrylic acid esters) as the unsaturated carboxylic acid compound.

The polymer in the resin composition 2 for golf balls can be obtained by reacting (copolymerizing) the diene polymer and the unsaturated carboxylic acid compound by a known method, and neutralizing carboxyl groups contained in the resulting reaction product or carboxyl groups derived from the unsaturated carboxylic acid compound that are generated from the reaction product.

For example, the polymer may be prepared by mixing a diene polymer (e.g. polybutadiene) having a $C_1$-$C_{18}$ halogenated alkane structure at each end and t-butyl acrylate in a predetermined ratio, copolymerizing them in the presence of, for example, a polymerization initiator and a catalyst, and then eliminating the t-butyl protective group to give a predetermined butadiene/acrylic acid copolymer having carboxyl groups, and subsequently neutralizing the carboxyl groups with an inorganic metal compound. The polymerization method is preferably a living radical polymerization method, particularly preferably an atom transfer radical polymerization method (ATRP). Moreover, carboxyl groups can be neutralized by, specifically, melting the above reaction product or a product obtained by generating carboxyl groups derived from the unsaturated carboxylic acid compound from the reaction product, adding a predetermined amount of an inorganic metal compound to the melt, and kneading the mixture. Suitable examples of the inorganic metal compounds include those described above.

Also, the polymer may be prepared by preparing a predetermined butadiene/acrylic acid copolymer having carboxyl groups by the above method, condensing the copolymer with one another using a condensing agent capable of condensing the copolymer to increase the molecular weight thereof, and then neutralizing the carboxyl groups with an inorganic metal compound.

Here, the structure of the polymer is not particularly limited, and examples thereof include a structure having diene polymer units and unsaturated carboxylic acid compound units randomly bonded to one another; a triblock copolymer structure formed of (polymerized units derived from an unsaturated carboxylic acid compound)/(units derived from a diene polymer)/(polymerized units derived from the unsaturated carboxylic acid compound); and a structure formed by condensing the polymer having the above triblock copolymer structure with one another.

The content of the unsaturated carboxylic acid compound based on 100% by mass of the polymer is preferably at least 8% by mass, more preferably at least 10% by mass, and still more preferably at least 15% by mass. The content is also preferably at most 50% by mass, more preferably at most 30% by mass, and still more preferably at most 25% by mass. When the content of the unsaturated carboxylic acid compound is adjusted within the range mentioned above, good resilience can be achieved.

From the viewpoint of the effect of the present invention, the ratio between the content of the diene polymer and the content of the unsaturated carboxylic acid compound (diene polymer/unsaturated carboxylic acid compound (by mass)) in the polymer is preferably 1/1 to 1/0.087, and more preferably 1/0.429 to 1/0.111.

The degree of neutralization of the carboxyl groups in the polymer is preferably at least 20%, more preferably at least 50%, and still more preferably at least 80%, while it is preferably at most 300%, more preferably at most 200%, and still more preferably at most 100%. When the degree of neutralization is adjusted within the range mentioned above, good resilience can be achieved.

The product (mass %×%) of the content of the unsaturated carboxylic acid compound based on 100% by mass of the polymer and the degree of neutralization of the carboxyl groups is preferably 160 to 4500, more preferably 300 to 3000, and still more preferably 1200 to 1500. The effect of the present invention can be sufficiently achieved when the product falls within the range mentioned above.

(First Resin Composition 3 for Golf Balls)

The first resin composition 3 for golf balls includes a polymer obtained by neutralizing (anhydrous) dicarboxyl groups contained in a diene polymer that contains an (anhydrous) dicarboxylic acid grafted thereon and has a 1,4-cis structure content of at least 41% by mass. Here, the site of the diene polymer onto which an (anhydrous) dicarboxylic acid is grafted (added) is not particularly limited, and may be any site of the polymer, such as in the main chain (polymer chain), an end (end of the polymer chain), or side chain (chain branching off from the polymer chain).

A diene polymer constituting the skeleton of the diene polymer that contains an (anhydrous) dicarboxylic acid grafted thereon and has a 1,4-cis structure content of at least 41% by mass is a polymer of a diene, and is as mentioned above.

The diene polymer that contains an (anhydrous) dicarboxylic acid grafted thereon and has a 1,4-cis structure content of at least 41% by mass has a number average molecular weight of 500 to 10,000, preferably 1,000 to 5,000.

Moreover, the diene polymer constituting the skeleton contains a 1,4-cis structure, and the diene polymer has a Cis content (1,4-cis structure content) of at least 41% by mass, preferably at least 60% by mass. When the cis content is at least 41% by mass, good resilience can be achieved.

Examples of the (anhydrous) dicarboxylic acids include, but not limited to, known anhydrous dicarboxylic acids and dicarboxylic acids, such as (anhydrous) succinic acid, (anhydrous) maleic acid, (anhydrous) glutaric acid, and (anhydrous) adipic acid. Anhydrous maleic acid is preferred among these from the viewpoints of flexibility, fluidity, and resilience.

The diene polymer is preferably one in which at least one (anhydrous) dicarboxylic acid selected from the group consisting of (anhydrous) succinic acid, (anhydrous) maleic acid, (anhydrous) glutaric acid, and (anhydrous) adipic acid is directly bonded to the main chain and/or an end of the diene polymer. The (anhydrous) dicarboxyl groups bonded to the main chain or ends may be the same as or different from one another, but are preferably the same as one another.

The diene polymer containing an (anhydrous) dicarboxylic acid grafted thereon can be prepared by a conventionally known method, such as by graft-adding an (anhydrous) dicarboxylic acid (e.g. (anhydrous) maleic acid) onto a diene polymer containing a 1,4-cis structure by a known method.

Especially from the viewpoints of significantly improving flexibility, fluidity, and resilience, the diene polymer is preferably a diene polymer having anhydrous maleic acid directly bonded to the main chain (polymer chain).

The polymer in the resin composition 3 for golf balls can be obtained by grafting an (anhydrous) dicarboxylic acid onto a diene polymer having a predetermined 1,4-cis structure content by a known method, and neutralizing (anhydrous) dicarboxyl groups contained in the resulting adduct.

For example, the polymer may be prepared by dissolving a diene polymer containing a 1,4-cis structure in an organic solvent, adding a predetermined amount of an (anhydrous) dicarboxylic acid (e.g. (anhydrous) maleic acid) to the solution, reacting them under heating in the presence of an organic peroxide and a polymerization inhibitor to give a diene polymer having (anhydrous) dicarboxyl groups, and then neutralizing the (anhydrous) dicarboxyl groups with an inorganic metal compound. Here, (anhydrous) dicarboxyl groups can be neutralized by, specifically, melting the diene polymer having (anhydrous) dicarboxyl groups, adding a predetermined amount of an inorganic metal compound to the melt, and kneading the mixture. At this time, a small amount of water may be added to promote the neutralization reaction. Suitable examples of the inorganic metal compounds include those described above.

Thus, in another suitable embodiment of the present invention, (anhydrous) dicarboxyl groups contained in the diene polymer that contains an (anhydrous) dicarboxylic acid grafted thereon and has a 1,4-cis structure content of at least 41% by mass are neutralized with at least one metal ion selected from the group consisting of $Na^+$, $Mg^{2+}$, $Ca^{2+}$, and $Zn^{2+}$.

The content of the (anhydrous) dicarboxylic acid based on 100% by mass of the polymer is preferably at least 2% by mass, and more preferably at least 4% by mass. The content of the (anhydrous) dicarboxylic acid is also preferably at most 30% by mass, more preferably at most 15% by mass, and still more preferably at most 10% by mass. When the content is adjusted within the range mentioned above, good resilience can be achieved.

From the viewpoint of the effect of the present invention, the ratio between the content of the diene polymer and the content of the (anhydrous) dicarboxylic acid (diene polymer/(anhydrous) dicarboxylic acid (by mass)) in the polymer is preferably 1/0.041 to 1/0.176, and more preferably 1/0.041 to 1/0.111.

The degree of neutralization of the (anhydrous) dicarboxyl groups in the polymer is preferably at least 20%, more preferably at least 50%, and still more preferably at least 80%, while it is preferably at most 300%, more preferably at most 200%, and still more preferably at most 100%. When the degree of neutralization is adjusted within the range mentioned above, good resilience can be achieved.

The degree of neutralization of (anhydrous) dicarboxyl groups refers to the ratio of the number of moles of neutralized (anhydrous) dicarboxyl groups to the total number of moles of (anhydrous) dicarboxyl groups contained in the polymer.

The degree of neutralization is calculated using the amounts of materials introduced although it can alternatively be calculated from the following formula using the number of moles of non-neutralized (anhydrous) dicarboxyl groups ([COOCO] or $[(COOH)_2]$) in the polymer, which is determined for example by heat-dissolving the polymer in tetrahydrofuran, and titrating the solution with potassium hydroxide having a specified concentration under heating, and the number of moles of neutralized (anhydrous) dicarboxyl groups $[(COOM)_2]$ calculated by metal analysis.

Degree of neutralization (mol %)=$[(COOM)_2]/([COOCO]+[(COOH)_2]+[(COOM)_2])\times 100$ The metal analysis may be performed in the same manner as described above, for example.

The product (mass %×%) of the content of the (anhydrous) dicarboxylic acid based on 100% by mass of the polymer and the degree of neutralization of the (anhydrous) dicarboxyl groups is preferably 80 to 4500, more preferably 200 to 3000, and still more preferably 400 to 1500. The effect of the present invention can be sufficiently achieved when the product falls within the range mentioned above.

(First Resin Composition 4 for Golf Balls)

The first resin composition 4 for golf balls includes a polymer obtained by neutralizing carboxyl groups and (anhydrous) dicarboxyl groups contained in a reaction product of a diol compound and a diene polymer containing an (anhydrous) dicarboxylic acid grafted (added) thereon (hereinafter, such a diene polymer is also referred to as grafted diene polymer). Here, the site of the diene polymer onto which an (anhydrous) dicarboxylic acid is grafted (added) is not particularly limited, and may be any site of the polymer, such as in the main chain (polymer chain), an end (end of the polymer chain), or side chain (chain branching off from the polymer chain).

A diene polymer constituting the skeleton of the diene polymer containing an (anhydrous) dicarboxylic acid grafted thereon is a polymer of a diene, and is as mentioned above.

The diene polymer containing an (anhydrous) dicarboxylic acid grafted thereon has a number average molecular weight of 500 to 10000, preferably 1000 to 5000.

Moreover, the diene polymer constituting the skeleton preferably contains a 1,4-cis structure, and the diene polymer more preferably has a cis content (1,4-cis structure content) of at least 41% by mass, still more preferably at least 60% by mass. When the cis content is at least 41% by mass, even better resilience can be achieved.

Examples of the (anhydrous) dicarboxylic acids include, but not limited to, known anhydrous dicarboxylic acids and dicarboxylic acids, such as (anhydrous) succinic acid, (anhydrous) maleic acid, (anhydrous) glutaric acid, and (anhydrous) adipic acid. Anhydrous maleic acid is preferred among these from the viewpoints of flexibility, fluidity, and resilience.

The diene polymer is preferably one in which at least one (anhydrous) dicarboxylic acid selected from the group consisting of (anhydrous) succinic acid, (anhydrous) maleic acid, (anhydrous) glutaric acid, and (anhydrous) adipic acid is directly bonded to the main chain and/or an end of the diene polymer. The (anhydrous) dicarboxyl groups bonded to the main chain or ends may be the same as or different from one another, but are preferably the same as one another.

Similarly to the above, the diene polymer containing an (anhydrous) dicarboxylic acid grafted thereon can be prepared by a conventionally known method, such as by graft-adding an (anhydrous) dicarboxylic acid (e.g. (anhydrous) maleic acid) onto a diene polymer containing a 1,4-cis structure by a known method.

Especially from the viewpoint of significantly improving flexibility, fluidity, and resilience, the diene polymer is preferably a diene polymer having anhydrous maleic acid directly bonded to the main chain (polymer chain).

A diol compound is used for the polymer in the resin composition 4 for golf balls. The diol compound is not particularly limited as long as it is a compound having two hydroxy groups per molecule. Still, from the viewpoint of ensuring good fluidity of the resulting resin composition for golf balls, at least one selected from the group consisting of $C_2$-$C_{20}$ hydrocarbons having two hydroxy groups, $C_2$-$C_{20}$ hydrocarbons having two hydroxy groups and at least one ether bond, $C_2$-$C_{20}$ hydrocarbons having two hydroxy groups and 1 to 3 carboxyl groups, and high molecular weight hydrocarbons having two hydroxy groups is preferred; at least one selected from the group consisting of $C_2$-$C_{20}$ hydrocarbons having two hydroxy groups, $C_2$-$C_{20}$ hydrocarbons having two hydroxy groups and at least one ether bond, and $C_2$-$C_{20}$ hydrocarbons having two hydroxy groups and 1 to 3 carboxyl groups is more preferred; and at least one selected from the group consisting of $C_2$-$C_{20}$ hydrocarbons having two hydroxy groups, and $C_2$-$C_{20}$ hydrocarbons having two hydroxy groups and 1 to 3 carboxyl groups is still more preferred. Here, the site of the diol polymer at which a hydroxy group exists is not particularly limited, and may be any site of the hydrocarbon, such as in an end (end of the hydrocarbon chain) or side chain (chain branching off from the hydrocarbon chain).

The $C_2$ to $C_{20}$ (preferably $C_2$ to $C_{10}$, more preferably $C_2$ to $C_8$, still more preferably $C_4$ to $C_6$) hydrocarbon having two hydroxy groups may be a saturated or unsaturated hydrocarbon. Also, it may have an acyclic (i.e. linear or branched) or cyclic structure (in the case of a cyclic hydrocarbon, the hydrocarbon has 3 to 20 carbons). The cyclic hydrocarbons include aromatic hydrocarbons (in the case of aromatic hydrocarbons, the number of carbons is 6 to 20). Specific examples of the $C_2$-$C_{20}$ hydrocarbon having two hydroxy groups include saturated acyclic hydrocarbons having two hydroxy groups, such as ethylene glycol, propanediol, butanediol, pentanediol, hexanediol, decanediol, and propylene glycol; unsaturated acyclic hydrocarbons having two hydroxy groups, such as 2-pentene-1,5-diol and 1,4-hexadiene-1,6-diol; and aromatic hydrocarbons having two hydroxy groups, such as cresol and naphthalenediol.

The $C_2$-$C_{20}$ (preferably $C_2$-$C_{10}$, more preferably $C_4$-$C_5$) hydrocarbon having two hydroxy groups and at least one ether bond has at least one (preferably 1 to 5, more preferably 1 to 3) ether bond within the hydrocarbon chain, and may be a saturated or unsaturated hydrocarbon. Also, it may have an acyclic (i.e. linear or branched) or cyclic structure. The cyclic hydrocarbons include aromatic hydrocarbons (in the case of aromatic hydrocarbons, the number of carbons is 6 to 20). Specific examples of the $C_2$-$C_{20}$ hydrocarbon having two hydroxy groups and at least one ether bond include diethylene glycol and triethylene glycol.

The $C_2$-$C_{20}$ (preferably $C_2$-$C_{10}$, more preferably $C_4$-$C_6$) hydrocarbon having two hydroxy groups and 1 to 3 carboxyl groups has 1 to 3 (preferably one) carboxyl groups, and may be a saturated or unsaturated hydrocarbon. Also, it may have an acyclic (i.e. linear or branched) or cyclic structure (in the case of a cyclic hydrocarbon, the hydrocarbon has 3 to 20 carbons). The cyclic hydrocarbons include aromatic hydrocarbons (in the case of aromatic hydrocarbons, the number of carbons is 6 to 20). Here, the site of the hydrocarbon at which a carboxyl group exists is not particularly limited, and may be any site of the hydrocarbon, such as in an end (end of the hydrocarbon chain) or side chain (chain branching off from the hydrocarbon chain).

Specific examples of the $C_2$-$C_{20}$ hydrocarbon having two hydroxy groups and 1 to 3 carboxyl groups include dimethylol butyric acid and dimethylol propionic acid.

The high molecular weight hydrocarbon having two hydroxy groups is a high molecular weight hydrocarbon compound, and may be a saturated or unsaturated hydrocarbon. Also, it may have an acyclic (i.e. linear or branched) structure or contain a cyclic structure.

The high molecular weight hydrocarbon preferably has a weight average molecular weight of 200 to 10000, more preferably 500 to 2000, from the viewpoint of the efficiency of the reaction between the hydroxy groups and the anhydrous dicarboxylic acid moiety of the grafted diene polymer.

The weight average molecular weight of the high molecular weight hydrocarbon can be determined by gel permeation chromatography (GPC) relative to polystyrene standards.

Specific examples of the high molecular weight hydrocarbon include polyethylene glycol, polypropylene glycol, polytetrahydrofuran, polycaprolactone diol, and polybutadiene diol represented by the following formula (1):

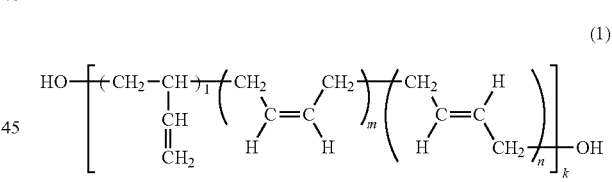

wherein k, l, m, and n each represent the number of the corresponding repeating units.

In particular, from the viewpoint of significantly improving flexibility, fluidity, and resilience, the diol compound is more preferably at least one selected from the group consisting of ethylene glycol, butanediol, hexanediol, decanediol, diethylene glycol, triethylene glycol, propylene glycol, dimethylol butyric acid, dimethylol propionic acid, polyethylene glycol, polypropylene glycol, polybutadiene diol, and polycaprolactone still more preferably at least one selected from the group consisting of ethylene glycol, 1,4-butanediol, dimethylol butyric acid, dimethylol propionic acid, and triethylene glycol; and particularly preferably at least one selected from the group consisting of 1,4-butanediol, dimethylol butyric acid, and dimethylol propionic acid.

The polymer in the resin composition 4 for golf balls can be obtained by reacting the grafted diene polymer and the diol compound by a known method, and neutralizing carboxyl groups and (anhydrous) dicarboxyl groups contained in the resulting reaction product. Here, if the reaction product does not contain (anhydrous) dicarboxyl groups, the "carboxyl groups and (anhydrous) dicarboxyl groups contained in the resulting reaction product" means "carboxyl groups contained in the resulting reaction product". That is, this expression does not mean that the reaction product for the polymer in the resin composition 4 for golf balls always has both carboxyl groups and (anhydrous) dicarboxyl groups.

For example, the grafted diene polymer having (anhydrous) dicarboxyl groups may be obtained by melting a diene polymer mentioned above in an organic solvent, adding a predetermined amount of an (anhydrous) dicarboxyl acid (e.g. (anhydrous) maleic acid), and reacting them under heating in the presence of an organic peroxide and a polymerization inhibitor. Subsequently, the grafted diene polymer may be reacted with the dial compound under heating to give a reaction product having carboxyl groups and (anhydrous) dicarboxyl groups. The conditions of the reaction between the grafted diene polymer and the dial compound under heating may be appropriately set and, for example, bath compounds may be kneaded at 110 to 160° C. for 1 to 8 hours. Then, carboxyl groups and (anhydrous) dicarboxyl groups contained in the obtained reaction product may be neutralized with an inorganic metal compound to prepare the above polymer. Here, carboxyl groups and (anhydrous) dicarboxyl groups can be neutralized by, specifically, melting the reaction product, adding a predetermined amount of an inorganic metal compound to the melt, and kneading the mixture. Suitable examples of the inorganic metal compounds include those described above.

Thus, in another suitable embodiment of the present invention, carboxyl groups and (anhydrous) dicarboxyl groups contained in a reaction product of the grafted diene polymer and the dial compound are neutralized with at least one metal ion selected from the group consisting of $Na^+$, $Mg^{2+}$, $Ca^{2+}$, and $Zn^{2+}$.

The content of the (anhydrous) dicarboxylic acid based on 100% by mass of the grafted diene polymer is preferably at least 2% by mass, and more preferably at least 4% by mass. The content is also preferably at most 30% by mass, more preferably at most 15% by mass, and still more preferably at most 10% by mass. When the content is adjusted within the range mentioned above, good resilience can be achieved.

From the viewpoint of the effect of the present invention, the ratio between the content of the diene polymer and the content of the (anhydrous) dicarboxylic acid (diene polymer/(anhydrous) dicarboxylic acid (by mass)) in the grafted diene polymer is preferably 1/0.041 to 1/0.176, and more preferably 1/0.041 to 1/0.111.

In the synthesis of the polymer, the ratio between the amounts of the grafted diene polymer and the diol compound introduced is preferably such that the amount of the diol compound is 0.20 to 0.70 molar equivalents, more preferably 0.25 to 0.60 molar equivalents, and still more preferably 0.40 to 0.55 molar equivalents per (anhydrous) dicarboxyl group of the grafted diene polymer.

The amount of carboxyl groups and (anhydrous) dicarboxyl groups contained in a reaction product obtained by reacting the grafted diene polymer and the diol compound is preferably 4 to 50% by mass, more preferably 4 to 20% by mass, and still more preferably 4 to 10% by mass.

The amount of carboxyl groups and (anhydrous) dicarboxyl groups can be calculated as described below. Amount of carboxyl groups (% by mass)=(2×([moles of (anhydrous) dicarboxyl groups in grafted diene polymer]−[moles of diol compound])+([moles of diol compound]×[number of carboxyl groups per molecule of diol compound]))×6,005/[weight (g) of reaction product]

1 One (anhydrous) dicarboxyl group is counted as two carboxyl groups in the calculation of the amount (% by mass).
2 A carboxyl group is considered to have the same molecular weight as acetic acid ($CH_3COOH$) in the calculation of the amount (% by mass).

The degree of neutralization of the carboxyl groups and (anhydrous) dicarboxyl groups in the polymer is preferably at least 20%, more preferably at least 50%, and still more preferably at least 80%, while it is preferably at most 300%, more preferably at most 200%, and still more preferably at most 100%. When the degree of neutralization is adjusted within the range mentioned above, good resilience can be achieved.

The degree of neutralization of carboxyl groups and (anhydrous) dicarboxyl groups refers to the ratio of the number of moles of neutralized carboxyl groups and (anhydrous) dicarboxyl groups to the total number of moles of carboxyl groups and (anhydrous) dicarboxyl groups contained in the polymer.

The degree of neutralization is calculated using the amounts of materials introduced although it can alternatively be calculated from the following formula using the number of moles of non-neutralized carboxyl groups ([COOH]) and non-neutralized (anhydrous) dicarboxyl groups ([COOCO] or [$(COOH)_2$]) in the polymer, which is determined for example by heat-dissolving the polymer in tetrahydrofuran, and titrating the solution with potassium hydroxide having a specified concentration under heating, and the number of moles of, neutralized carboxyl groups ([COOM]) and neutralized (anhydrous) dicarboxyl groups ([$(COOM)_2$]) calculated by metal analysis. Degree of neutralization (mol %)=([COOM]+[$(COOM)_2$])/([COOH]+[COOCO]+[$(COOH)_2$]+[COOM]+[$(COOM)_2$])×100

The metal analysis may be performed in the same manner as described above, for example.

[Second Resin Composition for Golf Balls]

The second resin composition for golf balls according to the present invention includes (A) a diene polymer that contains an (anhydrous) dicarboxylic acid grafted thereon and has a 1,4-cis structure content of at least 41% by mass, and (B) at least one selected from the group consisting of (b-1) a bipolymer of an olefin and a $C_3$-$C_8$ α,β-unsaturated carboxylic acid, (b-2) a metal ion-neutralized product of a bipolymer of an olefin and a $C_3$-$C_8$ α,β-unsaturated carboxylic acid, (b-3) a terpolymer of an olefin, a $C_3$-$C_8$ α,β-unsaturated carboxylic acid, and an α,β-unsaturated carboxylic acid ester, and (b-4) a metal, ion-neutralized product of a terpolymer of an olefin, a $C_3$-$C_8$ α,β-unsaturated carboxylic acid, and an α,β-unsaturated carboxylic acid ester.

When the component (B) is compounded with another resin component, i.e. a diene polymer that contains an (anhydrous) dicarboxylic acid grafted thereon and has a 1,4-cis structure content of at least 41% by mass, for example a diene polymer obtained by grafting (adding) an (anhydrous) dicarboxylic acid onto any site of a polymer (e.g. polybutadiene) having a predetermined 1,4-cis structure content, good flexibility, fluidity, and resilience can be achieved.

The diene polymer that contains an (anhydrous) dicarboxylic acid grafted thereon and has a 1,4-cis structure content of at least 41% by mass as the component (A) is as mentioned for the diene polymer of the first resin composition 3 for golf balls, and thus a detailed description therefor is omitted.

The content of the (anhydrous) dicarboxylic acid based on 100% by mass of the component (A) is preferably at least 1% by mass, and more preferably at least 13% by mass, while it is preferably at most 45% by mass, and more preferably at most 41% by mass. The content is particularly preferably 3% by mass. When the content is adjusted within the range mentioned above, good resilience can be achieved.

The amount of the component (A) for each 100 parts by mass of the component (B) is preferably at least 1 part by mass, more preferably at least 5 parts by mass, and still more preferably at least 15 parts by mass. The amount is also preferably at most 70 parts by mass. When the amount is adjusted within the range mentioned above, good resilience can be achieved.

The component (B) is not particularly limited, and may be a conventionally known material as long as it contains at least one of the components (b-1) to (b-4). In particular, the component (B) preferably contains the component (b-2) or (b-4).

The olefin for the component (B) is preferably a $C_2$-$C_8$ olefin. Olefins are aliphatic unsaturated hydrocarbons each having one double bond per molecule. Examples of the $C_2$-$C_8$ olefins include ethylene, propylene, butene, pentene, hexene, heptene, and octene. Preferred among these are ethylene and propylene, with ethylene being more preferred. These olefins may be used alone or in combination of two or more.

Examples of the $C_3$-$C_8$ $\alpha,\beta$-unsaturated carboxylic acids for the component (B) include acrylic acid, methacrylic acid, (anhydrous) maleic acid, fumaric acid, crotonic acid (trans-2-butenoic acid), isocrotonic acid (cis-2-butenoic acid), sorbic acid, citraconic acid, and mesaconic acid. Acrylic acid, methacrylic acid, and (anhydrous) maleic acid are preferred among these from the viewpoints of flexibility, fluidity, and resilience.

Examples of the $\alpha,\beta$-unsaturated carboxylic acid esters for the component (B) include methyl, ethyl, propyl, n-butyl, and isobutyl esters of acrylic acid, methacrylic acid, maleic acid, fumaric acid, crotonic acid (trans-2-butenoic acid), isocrotonic acid (cis-2-butenoic acid), 0.15 sorbic acid, citraconic acid, mesaconic acid or the like. Acrylic acid esters and methacrylic acid esters are preferred among these from the viewpoints of flexibility, fluidity, and resilience.

The content of the olefin based on 100% by mass of the component (B) is preferably at least 30% by mass, more preferably at least 47% by mass, and still more preferably at least 55% by mass. The content is also preferably at most 96% by mass, more preferably at most 90% by mass, and still more preferably at most 85% by mass. When the content is adjusted within the range mentioned above, good resilience can be achieved.

The content of the $\alpha,\beta$-unsaturated carboxylic acid based on 100% by mass of the component (B) is preferably at least 4% by mass, more preferably at least 5% by mass, and still more preferably at least 8% by mass. The content is also preferably at most 50% by mass, more preferably at most 30% by mass, and still more preferably at most 20% by mass. When the content is adjusted within the range mentioned above, good resilience can be achieved.

The content of the $\alpha,\beta$-unsaturated carboxylic acid ester based on 100% by mass of the component (B) is preferably at least 0% by mass, more preferably at least 7% by mass, and still more preferably at least 10% by mass. The content is also preferably at most 40% by mass, more preferably at most 32% by mass, and still more preferably at most 20% by mass. When the content is adjusted within the range mentioned above, good resilience can be achieved.

In the components (b-2) and (b-4), carboxyl groups contained in the copolymer are neutralized with an inorganic metal compound. The resin composition preferably contains as the component (C) at least one metal ion selected from the group consisting of $Na^+$, $Mg^{2+}$, $Ca^{2+}$, and $Zn^{2+}$.

The degree of neutralization of the carboxyl groups in the component (B) is preferably at least 50%, and more preferably at least 80%, while it is preferably at most 500%, more preferably at most 300%, and still more preferably at most 150%. When the degree of neutralization is adjusted within the range mentioned above, good resilience can be achieved.

The product (mass %×%) of the content of the $\alpha,\beta$-unsaturated carboxylic acid based on 100% by mass of the component (B) and the degree of neutralization of the carboxyl groups is preferably 750 to 5500, more preferably 1000 to 3000, and still more preferably 1200 to 2000. The effect of the present invention can be sufficiently achieved when the product falls within the range mentioned above.

Each polymer as the component (B) can be synthesized by a known method, and may be a commercially available item.

The second resin composition for golf balls according to the present invention may be obtained for example by adding a predetermined amount of the component (A) to the component (B), and kneading the mixture.

(Others)

The resin composition for golf balls according to the present invention may further contain additives, such as a pigment component including white pigments (e.g. titanium oxide) and blue pigments, weighting agents, dispersants, antioxidants, ultraviolet absorbents, light stabilizers, fluorescent materials, and fluorescent brighteners, as long as they do not impair golf ball performance. Furthermore, in the resin composition for golf balls according to the present invention, for example, a fatty acid and/or a metal salt thereof may be used in combination as long as they do not impair the effect of the present invention.

The amount of white pigment (e.g. titanium oxide) for each 100 parts by mass of the resin component in the resin composition is preferably at least 0.5 parts by mass, and more preferably at least 1 part by mass. The amount is also preferably at most 10 parts by mass, and more preferably at most 8 parts by mass. When the amount is at least 0.5 parts by mass, hiding properties can be provided to resulting golf ball members. If the amount is more than 10 parts by mass, golf balls having lower durability may be obtained.

The resin composition for golf balls according to the present invention may be prepared, for example, by dry-blending the above components. Then, the dry-blended mixture may be extruded into pellets. The dry-blending is preferably performed with, for example, a mixer that can compound pelletized materials, more preferably a tumbler mixer. The extrusion may be performed with a known extruder, such as a single-screw extruder, a twin-screw extruder, or a twin-screw/single-screw extruder.

The resin composition for golf balls according to the present invention preferably has a spin-lattice relaxation time of $^{13}C$ nuclei (T1), measured by high-resolution solid-state $^{13}C$ nuclear magnetic resonance (NMR) spectroscopy, of 15 seconds or shorter, more preferably 12 seconds or shorter, still more preferably 10 seconds or shorter, and further preferably 8 seconds or shorter.

The resin composition for golf balls according to the present invention preferably has a storage modulus E' (Pa) and a loss modulus E" (Pa) which satisfy the following inequality when measured with a dynamic viscoelasticity apparatus in a tensile mode at a vibration frequency of 10

Hz, a temperature of 12° C., and a measurement strain of 0.05%. When the resin composition for golf balls satisfies the following inequality, high resilience can be achieved while a high level of softness is maintained. In the inequality, the symbol "log" means the common logarithm.

$$\log(E'/E''^2) \geq -6.55$$

Resilience is considered to increase as the thus determined storage modulus E' (Pa) increases or the thus determined loss modulus E" (Pa) decreases. Also, hardness increases as the storage modulus E' (Pa) increases. In the above inequality, the numerator is the first power of the storage modulus E', whereas the denominator is the second power of the loss modulus E". This means that, for enhancing resilience, it is more effective to reduce loss modulus E" than to increase storage modulus E' so as to increase hardness. In other words, it is considered that what is necessary to enhance resilience without hardening the material is to reduce loss modulus E" to thereby reduce energy loss upon deformation. In the present invention, since the increase in molecular mobility as described above enables the material to be smoothly deformed under stress, it is considered that energy loss will be small and thus resilience can be enhanced.

The $\log(E'/E''^2)$ value is preferably −6.23 or higher, more preferably −6.02 or higher, and still more preferably −5.89 or higher. Also, the upper limit of $\log(E'/E''^2)$ is not particularly limited, and is preferably −5.24 or lower, and more preferably −5.40 or lower. This is because, if the $\log(E'/E'')$ value comes to −5.25, the coefficient of restitution becomes close to the maximum value of 1. The dynamic viscoelastic properties are measured at a vibration frequency of 10 Hz and a temperature of 12° C. for the following reason. The period of contact between a golf ball and an impact bar (metal cylinder) is 500 μsec in the measurement of coefficient of restitution at 40 m/s. If this contact is assumed to correspond to deformation in one cycle, this deformation corresponds to deformation at a frequency of several thousand hertz. Based on the frequency-temperature superposition principle of general ionomer resin, the dynamic viscoelastic properties measured at room temperature and at a vibration frequency of several thousand hertz correspond to the dynamic viscoelastic properties measured at a temperature of 12° C. and a vibration frequency of 10 Hz.

The resin composition for golf balls according to the present invention preferably has a melt flow rate (190° C., 2.16 kg) of 1.0 g/10 min or higher, more preferably 1.5 g/10 min or higher, and still more preferably 2.0 g/10 min or higher. The melt flow rate is preferably 100 g/10 min or lower, more preferably 80 g/10 min or lower, and still more preferably 50 g/10 min or lower. When the melt flow rate falls within the range mentioned above, the composition can exhibit good moldability into golf ball members.

The resin composition for golf balls preferably has a rebound resilience of 60% or higher, more preferably 65% or higher, still more preferably 70% or higher, and particularly preferably 75% or higher. The use of the resin composition for golf balls having a rebound resilience of 60% or higher provides golf balls excellent in resilience (flight distance). The rebound resilience of a resin composition for golf balls herein refers to a rebound resilience measured after the resin composition for golf balls is formed into a sheet, and is measured by the method mentioned later.

The resin composition for golf balls preferably has a slab hardness, measured in Shore D hardness, of 5 or higher, more preferably 10 or higher, and still more preferably 20 or higher. Also, the slab hardness (Shore D hardness) is preferably 50 or lower, more preferably 30 or lower, and still more preferably 25 or lower. The use of the resin composition for golf balls having a slab hardness of 5 or higher provides golf balls having excellent resilience (flight distance), while the use of the resin composition for golf balls having a slab hardness of 50 or lower provides golf balls having excellent durability. The slab hardness of a resin composition for golf balls herein refers to a hardness measured after the resin composition for golf balls is formed into a sheet, and is measured by the method mentioned later.

It should be noted that unless otherwise noted, the expression "the resin composition for golf balls according to the present invention" used alone in the description provided above means that the description relates to both the first and second resin compositions for golf balls according to the present invention.

[Golf Balls]

The golf ball according to the present invention is not particularly limited as long as it includes a member formed from the resin composition for golf balls mentioned above. Examples thereof include: one-piece golf balls; two-piece golf balls which include a monolayer core and a cover disposed to cover the monolayer core; three-piece golf balls which include a core having a center and an intermediate monolayer disposed to cover the center, and a cover disposed to cover the core; and multi-piece golf balls (including the three-piece golf balls) which include a core having a center and one or more intermediate layers disposed to cover the center, and a cover disposed to cover the core, provided that any member in each of these golf balls is formed from the resin composition for golf balls according to the present invention. Preferred embodiments among these are: golf balls including a mono- or multi-layered core and a cover covering the core, at least one layer of the core being formed from the resin composition for golf balls; and one-piece golf balls including a golf ball body that is formed from the resin composition for golf balls. Particularly preferred embodiments are: two-piece golf balls including a monolayer core and a cover disposed to cover the monolayer core, the monolayer core being formed from the resin composition for golf balls; and multi-piece golf balls including a core having a center and one or more intermediate layers disposed to cover the center, and a cover disposed to cover the core, the center being formed from the resin composition for golf balls.

The following specifically illustrates the golf ball according to the present invention by reference to, but not limited to, embodiments of two-piece golf balls including a core and a cover disposed to cover the core, the core being formed from the aforementioned resin composition for golf balls.

The core may be formed, for example, by injection-molding the resin composition for golf balls. Specifically, the injection-molding is preferably performed by heat-melting the resin composition for golf balls at 160 to 260° C., and injecting it into a mold clamped under a pressure of 1 to 100 MPa, over 1 to 100 seconds, followed by cooling for 30 to 300 seconds, and then opening the mold.

The core preferably has a spherical shape. If the core is not spherical, then the cover may have a non-uniform thickness, resulting in its portion having low covering properties.

The core preferably has a diameter of 39.00 mm or greater, more preferably 39.25 mm or greater, and still more preferably 39.50 mm or greater. The diameter is also preferably 42.37 mm or smaller, more preferably 42.22 mm or smaller, and still more preferably 42.07 mm or smaller. When the diameter is 39.00 mm or greater, the cover layer will not have an excessively great thickness, resulting in good resilience. Conversely, when the diameter is 42.37 mm or smaller, the cover layer will not have an excessively small thickness, allowing the cover to exert sufficient protection function.

In the case that the core has a diameter of 39.00 to 42.37 mm, the amount of compression deformation (shrink in the compression direction) of the core when compressed from an initial load of 98 N to a final load of 1275 N is preferably 1.00 mm or greater, and more preferably 1.10 mm or greater. The amount of compression deformation is also preferably 5.00 mm or smaller, more preferably 4.90 mm or smaller, and still more preferably 4.80 mm or smaller. When the amount of compression deformation is 1.00 mm or greater, a good shot feeling can be obtained. When the amount of compression deformation is 5.00 mm or smaller, good resilience can be obtained.

The core preferably has a surface hardness, measured in Shore D hardness, of 20 or higher, more preferably 25 or higher, and still more preferably 30 or higher. The surface hardness (Shore D hardness) is also preferably 70 or lower, and more preferably 69 or lower. When the surface hardness is 20 or higher, the core is not excessively soft and thus good resilience can be obtained. When the surface hardness is 70 or lower, the core is not excessively hard and thus a good shot feeling can be obtained.

The core preferably has a central hardness, measured in Shore D hardness, of 5 or higher, more preferably 7 or higher, and still more preferably 10 or higher. If the central hardness is lower than 5, the core may be excessively soft, resulting in lower resilience. Also, the core preferably has a central hardness, measured in Shore D hardness, of 50 or lower, more preferably 48 or lower, and still more preferably 46 or lower. If the central hardness is more than 50, the core tends to be excessively hard, leading to a deteriorated shot feeling. In the present invention, the central hardness of a core means a hardness measured by cutting the core into two equal parts, and measuring the hardness of the part at the central point of the cut plane with a spring type Shore D hardness tester.

The core may preferably further contain a filler. The filler is used mainly as a weighting agent for adjusting the density of a golf ball to be obtained as the final product within the range of 1.0 to 1.5, and may be added as needed. Examples of the fillers include inorganic fillers such as zinc oxide, barium sulfate, calcium carbonate, magnesium oxide, tungsten powder, and molybdenum powder. The amount of filler for each 100 parts by mass of the resin component is preferably 0.5 parts by mass or more, and more preferably 1.0 part by mass or more. The amount is also preferably 30 parts by mass or less, and more preferably 20 parts by mass or less. If the amount of filler is less than 0.5 parts by mass, it tends to be difficult to adjust the weight. If the amount is more than 30 parts by mass, the weight fraction of the resin component tends to be reduced so that resilience can decrease.

The cover of the golf ball according to the present invention is preferably formed from a cover composition containing a resin component. Examples of resins that may be contained in the resin component include various resins such as ionomer resins, polyester resins, urethane resins (e.g. thermoplastic urethane resins, two-pack curable urethane resins), and polyamide resins.

Preferred examples of ionomer resins that may be used in the cover of the golf ball include "Himilan (registered trademark) (e.g. Himilan 1555 (Na), Himilan 1557 (Zn), Himilan 1605 (Na), Himilan 1706 (Zn), Himilan 1707 (Na), Himilan AM 7311 (Mg), Himilan AM 7329 (Zn), Himilan AM 7327 (Zn), Himilan 1855 (Zn), Himilan 1856 (Na), Himilan AM 7331 (Na))" available from Du Pont-Mitsui Polychemicals Co., Ltd.; "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD 8546 (Li), Surlyn 6320 (Mg), Surlyn 8120 (Na), Surlyn 8320 (Na), Surlyn 9320 (Zn), Surlyn 9320W (Zn))" available from Du Pont; and "Iotek (registered trademark) (e.g. Iotek 8000 (Na), Iotek 8030 (Na), Iotek 7010 (Zn), Iotek 7030 (Zn), Iotek 7510 (Zn), Iotek 7520 (Zn))" available from ExxonMobil Chemical. Here, the symbols such as Na, Zn, and Mg indicated within the parentheses following the trade names each show the kind of metal ion used for neutralization. These ionomer resins may be used alone or in combination of two or more.

Examples of resins also include thermoplastic polyamide elastomers available from Arkema under the trade name "Pebax (registered trademark) (e.g. "Pebax 2533")"; thermoplastic polyester elastomers available from Du Pont-Toray Co., Ltd. under the trade name "Hytrel (registered trademark) (e.g. "Hytrel 3548", "Hytrel 4047")"; thermoplastic polyurethane elastomers available from BASF Japan Ltd. under the trade name "Elastollan (registered trademark) (e.g. "Elastollan XNY 97A")"; and thermoplastic styrene elastomers available from Mitsubishi Chemical Corp. under the trade name "RABALON (registered trademark)". These resins may be used alone, or two or more of these may be used in admixture.

The cover composition forming the cover of the golf ball more preferably contains a polyurethane resin (including polyurethane elastomers) or an ionomer resin as the resin component. The content of polyurethane resin or ionomer resin in the resin component of the cover composition is preferably at least 50% by mass, more preferably at least 60% by mass, and still more preferably at least 70% by mass.

In addition to the aforementioned resin component, the cover composition may further contain additives, such as a pigment component including white pigments (e.g. titanium oxide), blue pigments and red pigments, zinc oxide, weighting agents including calcium carbonate and barium sulfate, dispersants, antioxidants, ultraviolet absorbents, light stabilizers, fluorescent materials, and fluorescent brighteners, as long as they do not impair the performance of the cover.

The amount of white pigment (e.g. titanium oxide) for each 100 parts by mass of the resin component forming the cover is preferably at least 0.5 parts by mass, and more preferably at least 1 part by mass. The amount is also preferably at most 10 parts by mass, and more preferably at most 8 parts by mass. When the amount of white pigment is at least 0.5 parts by mass, hiding properties can be provided to the cover. If the amount is more than 10 parts by mass, the resulting cover may have lower durability.

The cover of the golf ball according to the present invention may be formed, for instance, by a compression molding method in which hollow shells are formed from the cover composition, the core is covered with the plurality of shells, and then the assembly is compression-molded (preferably, hollow half shells are formed from the cover composition, the core is covered with the two half shells, and then the assembly is compression-molded), or by an injection molding method in which the cover composition is directly injection-molded on the core.

In the case of forming a cover by injection-molding the cover composition, the pelletized cover composition, which is prepared by extrusion in advance, may be injection-molded, or alternatively the materials for the cover, such as a base resin component and a pigment, may be dry-blended and then directly injection-molded. The upper and lower molds for forming the cover each preferably have a hemispherical cavity with pimples a part of which also serve as retractable hold pins. The cover may be formed by injection molding as follows: the hold pins are protruded; the core is put into the mold and held by the pins; and then the cover composition is injected thereon and cooled. More specifically, the cover may preferably be formed as follows: the mold is clamped under a pressure of 9 to 15 MPa, the cover composition heated to 200° C. to 250° C. is injected into the mold over 0.5 to 5 seconds, and then cooled for 10 to 60 seconds, and the mold is opened.

In forming a cover, indentations called dimples are usually formed on the surface. The cover preferably has 200 to 500 dimples in total. If the total number of dimples is less than 200, the effect of dimples is less likely to be achieved. Also, if the total number of dimples is more than 500, then the individual size of the dimples becomes small and thus the effect of dimples is less likely to be achieved. The shape (in a plan view) of each dimple to be formed is not particularly limited, and examples thereof include: a circular shape; polygonal shapes such as a substantially triangular shape, substantially quadrangular shape, substantially pentagonal shape, and substantially hexagonal shape; and other irregular shapes. These shapes may be used alone or in combination of two or more.

The cover preferably has a thickness of at most 2.0 mm, more preferably at most 1.6 mm, still more preferably at most 1.2 mm, and particularly preferably at most 1.0 mm. When the thickness is at most 2.0 mm, golf balls having better resilience and shot feeling can be obtained. The cover also preferably has a thickness of at least 0.1 mm, more preferably at least 0.2 mm, and still more preferably at least 0.3 mm. If the thickness is smaller than 0.1 mm, it may be difficult to form such a cover; moreover, the cover may have lower durability and abrasion resistance.

After the cover is formed, the golf ball body is taken out of the mold, and then preferably subjected to a surface treatment such as deburring, cleaning, and sandblasting, as necessary. If desired, a paint layer or a mark may be formed on the surface. The paint layer may have any thickness, and preferably has a thickness of at least 5 µm, more preferably at least 7 µm. The paint layer also preferably has a thickness of at most 25 µm, more preferably at most 18 µm. If the thickness is smaller than 5 µm, the paint layer tends to easily wear out and disappear after continuous use. If the thickness is greater than 25 µm, the effect of dimples tends to be reduced so that resulting golf balls can have a lower flight performance.

The amount of compression deformation (shrink in the compression direction) of the golf ball according to the present invention when compressed from an initial load of 98 N to a final load of 1275 N is preferably at least 2.0 mm, and more preferably at least 2.2 mm. The amount of compression deformation is also preferably at most 4.0 mm, and more preferably at most 3.5 mm. The golf ball with an amount of compression deformation of at least 2.0 mm is not too hard and can give a good shot feeling, while the golf ball with an amount of compression deformation of at most 4.0 mm has high resilience.

The above description shows the embodiments in which the resin composition for golf balls according to the present invention is used in a core. The resin composition for golf balls according to the present invention can also be used in a center, an intermediate layer, or a cover. In the case where a center is formed from the resin composition for golf balls according to the present invention, an intermediate layer may be formed from, for example, a resin component as listed above for the cover.

EXAMPLES

The present invention will be described in greater detail referring to, but not limited to, examples.
[Evaluation Methods]
(1) Slab Hardness (Shore D Hardness)
A resin composition for golf balls was hot press-molded into sheets having a thickness of about 2 mm, which were then stored at 23° C. for 2 weeks. Three or more sheets were stacked on one another so as not to be affected by the measurement substrate and the like, and the slab hardness of the stack was measured with a P1-series auto rubber hardness tester (from KOBUNSHI KEIKI CO., LTD.) including a spring type Shore D hardness tester in conformity with ASTM-D 2240.
(2) Melt Flow Rate (MFR) (g/10 Min)
MFR was measured with a flow tester (Shimadzu Flow-tester CFT-1000, Shimadzu Corp.) in conformity with JIS K 7210. The measurement was performed at a measurement temperature of 190° C. and a load of 2.16 kg.
(3) Rebound Resilience (%)
A resin composition for golf balls was hot press-molded into a sheet having a thickness of about 2 mm, and then circular pieces having a diameter of 28 mm were punched out of this sheet. Six pieces were stacked to prepare a cylindrical specimen having a thickness of about 12 mm and a diameter of 28 mm. This specimen was subjected to a Lupke rebound resilience test (at a temperature of 23° C. and a humidity of 50 RH %). The specimen preparation and the testing method employed were in conformity with JIS K 6255.
(4) Amount of Compression Deformation
The amount of deformation in the compression direction (the amount of shrink in the compression direction) of a spherical body when compressed from an initial load of 98 N to a final load of 1275 N was measured.
(5) Coefficient of Restitution
A 198.4-g metal cylinder was allowed to collide with each spherical body at a speed of 40 m/s. The speeds of the cylinder and the golf ball before and after the collision were measured. Based on these speeds and the weight of each golf ball, the coefficient of restitution of the golf balls was calculated. For each kind of spherical body, 12 pieces were measured and the average value was reported as the coefficient of restitution for the kind of spherical body.
(6) Shot Feeling
Each golf ball was subjected to a hitting test by 10 amateur (advanced) golfers using a driver, and the golfers evaluated the ball for the feeling when hitting it, according to the following criteria. The most common grade among the grades given by the 10 golfers was used as the shot feeling of the golf ball.
Criteria for grades
Excellent: small impact and good feeling
Good: ordinary levels
Poor: large impact and poor feeling
(7) Method of Measuring Spin-Lattice Relaxation Time of $^{13}C$ Nuclei (T1) by High-Resolution Solid-State $^{13}C$ Nuclear Magnetic Resonance (NMR) Spectroscopy Device: Bruker Avarice 400
Measurement method: $T_1$ relaxation time measurement by Torchia method
Measurement frequency: 100.6256207 MHz
Measurement temperature: room temperature
Standard substance: adamantane
Magic angle spinning rate: 5000 Hz
Pulse width: 4.80 μsec
Contact time: 2000 μsec
Pulse interval: 1 μsec, 100 msec, 500 msec, 1 sec, 2 sec, 3 sec, 4 sec, 6 sec, 8 sec, 10 sec, 12 sec, 15 sec, 20 sec, 40 sec, 80 sec, and 120 sec
Magnetic field strength: 9.4 T
(8) Measurement of Storage Modulus E' (Pa) and Loss Modulus E" (Pa)

The storage modulus E' (Pa) and loss modulus E" (Pa) of a resin composition for golf balls were measured under the following conditions.
Device: dynamic viscoelasticity apparatus Rheogel-E 4000 (available from UBM)
Measurement sample: a 4-mm-wide specimen (distance between clamps: 20 mm) cut out of a 2-mm-thick sheet that was prepared by press-molding the resin composition for golf balls
Measurement mode: Tensile
Measurement temperature: 12° C.
Vibration frequency: 10 Hz
Measurement strain: 0.05%
(Preparation of BD/AA Copolymer (1-1) (Cis Content: 20%, Acid Content: 15%))

A polybutadiene (85 parts by mass) obtained by adding an acrylate group to a polybutadiene having an OH group at each end (R-45HT from Idemitsu Kasen Co., Ltd., cis content: 20% by mass) by a known method was mixed with t-butyl acrylate (27 parts by mass). To this mixture were added ethyl α-bromobutyrate (0.005 parts by mass) and a mixed solution (0.01 parts by mass) of copper(II) chloride/tris[2-(dimethylamino)ethyl]amine/tin 2-ethylhexanoate/anisole (=1/5/10/500), and the resulting mixture was heated at 70° C. for 8 hours. Then, trifluoroacetic acid (108 parts by mass) was added and they were stirred at room temperature for 12 hours. The resulting product was washed with a 10-fold amount of ethanol, dried at 100° C. for at least 16 hours, whereby a BD/AA copolymer (1-1) was prepared.

(Preparation of BD/AA Copolymer (1-2) (Cis Content: 20%, Acid Content: 8%))

A BD/AA copolymer (1-2) was prepared in the same manner as in the preparation of the copolymer (1-1), except that the amount of the polybutadiene containing an acrylate group added thereto was changed to 92 parts by mass and the amount of t-butyl acrylate was changed to 14.2 parts by mass.

(Preparation of BD/AA Copolymer (1-3) (Cis Content: 20%, Acid Content: 50%))

A BD/AA copolymer (1-3) was prepared in the same manner as in the preparation of the copolymer (1-1), except that the amount of the polybutadiene containing an acrylate group added thereto was changed to 50 parts by mass and the amount of t-butyl acrylate was changed to 89 parts by mass.

(Preparation of BD/AA Copolymer (1-4) (Cis Content: 10%, Acid Content: 15%))

A BD/AA copolymer (1-4) was prepared in the same manner as in the preparation of the copolymer (1-1), except that the polybutadiene having an OH group at each end (cis content: 20% by mass) was changed to another polybutadiene having an OH group at each end (G-3000 from Nippon Soda Co., Ltd., cis content: 10% by mass).

[Preparation of Spherical Body (Core) (Except for Comparative Example 1-2 in Table 1)]

The compounding materials shown in Table 1 to 6 were dry-blended, and mixed and extruded into cold water with a twin-screw kneading extruder to form a strand. The extruded strand was cut into pellets with a pelletizer, whereby a pelletized resin composition for golf balls was prepared. The extrusion was performed with a screw diameter of 45 mm, a screw rotation rate of 200 rpm, and a screw L/D ratio of 35. The mixture was heated to 160 to 230° C. in the die of the extruder. The pelletized resin composition for golf balls was injection-molded at 220° C. to prepare a spherical body (core) having a diameter of 40 mm.

[Preparation of Spherical Body (Core) (Comparative Example 1-2 in Table 1)]

A spherical body (core) having a diameter of 40 mm was prepared by kneading the compounding materials shown under Comparative Example 1-2 in Table 1 with a kneading roll, and heat pressing the mixture with upper and lower molds each having a hemispherical cavity at 170° C. for 20 minutes.

TABLE 1

(Comparison with conventional materials)

| | | Example | Comparative Example | |
|---|---|---|---|---|
| | | 1-1 | 1-1 | 1-2 |
| Formulation | BD/AA Copolymer (1-1) | 100.0 | — | — |
| | NUCREL N1560 | — | 100.0 | — |
| | Polybutadiene rubber | — | — | 100.0 |
| | Magnesium hydroxide | 5.1 | 5.1 | — |
| | Zinc acrylate | — | — | 40.0 |
| | Cis content (% by mass) | 20 | 20 | 20 |
| | Content of unsaturated carboxylic acid compound (% by mass) | 15 | 15 | — |
| Physical properties | Degree of neutralization (%) | 100 | 100 | — |
| | MFR (g/10 min) | 3.0 | 2.1 | 0.0 |
| | Shore D hardness | 24 | 53 | 25 |
| | Rebound resilience (%) | 70 | 59 | 65 |
| | Log(E'/E"$^2$) | −5.56 | −5.98 | −5.75 |
| | $T_1$ relaxation time (sec) | 3.5 | 6.8 | 4.7 |
| | Amount of compression deformation | 9.2 | 1.4 | 8.3 |
| | Coefficient of restitution | 0.873 | 0.757 | 0.820 |
| | Shot feeling | Excellent | Poor | Excellent |

TABLE 2

(Content of unsaturated carboxylic acid compound)

| | | Example | | |
|---|---|---|---|---|
| | | 1-2 | 1-1 | 1-3 |
| Formulation | BD/AA copolymer (1-1) | — | 100.0 | — |
| | BD/AA copolymer (1-2) | 100.0 | — | — |
| | BD/AA copolymer (1-3) | — | — | 100.0 |
| | Magnesium hydroxide | 2.7 | 5.1 | 16.9 |
| | Cis content (% by mass) | 20 | 20 | 20 |
| | Content of unsaturated carboxylic acid compound (% by mass) | 8 | 15 | 50 |
| Physical properties | Degree of neutralization (%) | 100 | 100 | 100 |
| | MFR (g/10 min) | 2.1 | 3.0 | 1.7 |
| | Shore D hardness | 23 | 24 | 28 |
| | Rebound resilience (%) | 66 | 70 | 65 |
| | $\mathrm{Log}(E'/E''^2)$ | −5.71 | −5.56 | −5.75 |
| | $T_1$ relaxation time (sec) | 4.5 | 3.5 | 4.7 |
| | Amount of compression deformation | 10.2 | 9.2 | 6.4 |
| | Coefficient of restitution | 0.830 | 0.873 | 0.820 |
| | Shot feeling | Excellent | Excellent | Excellent |

TABLE 3

(Cis content)

| | | Example | | |
|---|---|---|---|---|
| | | 1-1 | 1-4 | 1-5 |
| Formulation | BD/AA copolymer (1-1) | 100.0 | 50.0 | — |
| | BD/AA copolymer (1-4) | — | 50.0 | 100.0 |
| | Magnesium hydroxide | 5.1 | 5.1 | 5.1 |
| | Cis content (% by mass) | 20 | 15 | 10 |
| | Content of unsaturated carboxylic acid compound (% by mass) | 15 | 15 | 15 |
| Physical properties | Degree of neutralization (%) | 100 | 100 | 100 |
| | MFR (g/10 min) | 3.0 | 2.1 | 1.9 |
| | Shore D hardness | 24 | 25 | 27 |
| | Rebound resilience (%) | 70 | 67 | 64 |
| | $\mathrm{Log}(E'/E''^2)$ | −5.56 | −5.67 | −5.79 |
| | $T_1$ relaxation time (sec) | 3.5 | 4.2 | 5.0 |
| | Amount of compression deformation | 9.2 | 8.3 | 6.9 |
| | Coefficient of restitution | 0.873 | 0.841 | 0.809 |
| | Shot feeling | Excellent | Excellent | Excellent |

TABLE 4

(Kind of inorganic metal compound)

| | | Example | | | |
|---|---|---|---|---|---|
| | | 1-1 | 1-6 | 1-7 | 1-8 |
| Formulation | BD/AA copolymer (1-1) | 100.0 | 100.0 | 100.0 | 100.0 |
| | Magnesium hydroxide | 5.1 | — | — | — |
| | Sodium hydroxide | — | 7.1 | — | — |
| | Zinc oxide | — | — | 7.1 | — |
| | Calcium hydroxide | — | — | — | 6.5 |
| | Cis content (% by mass) | 20 | 20 | 20 | 20 |
| | Content of unsaturated carboxylic acid compound (% by mass) | 15 | 15 | 15 | 15 |
| Physical properties | Degree of neutralization (%) | 100 | 100 | 100 | 100 |
| | MFR (g/10 min) | 3.0 | 2.2 | 2.0 | 2.2 |
| | Shore D hardness | 24 | 24 | 25 | 26 |
| | Rebound resilience (%) | 70 | 68 | 65 | 64 |
| | $\mathrm{Log}(E'/E''^2)$ | −5.56 | −5.64 | −5.75 | −5.79 |
| | $T_1$ relaxation time (sec) | 3.5 | 3.9 | 4.7 | 5.0 |
| | Amount of compression deformation | 9.2 | 9.2 | 8.3 | 7.6 |
| | Coefficient of restitution | 0.873 | 0.851 | 0.820 | 0.809 |
| | Shot feeling | Excellent | Excellent | Excellent | Excellent |

TABLE 5

(Degree of neutralization)

| | | Example | | | | | |
|---|---|---|---|---|---|---|---|
| | | 1-9 | 1-10 | 1-11 | 1-1 | 1-12 | 1-13 |
| Formulation | BD/AA copolymer (1-1) | 100.0 | 100.0 | 100.0 | 100.0 | 100.0 | 100.0 |
| | Magnesium hydroxide | 1.0 | 2.5 | 4.1 | 5.1 | 10.2 | 15.2 |
| | Cis content (% by mass) | 20 | 20 | 20 | 20 | 20 | 20 |
| | Content of unsaturated carboxylic acid compound (% by mass) | 15 | 15 | 15 | 15 | 15 | 15 |
| Physical properties | Degree of neutralization (%) | 20 | 50 | 80 | 100 | 200 | 300 |
| | MFR (g/10 min) | 17.0 | 11.0 | 3.3 | 3.0 | 1.5 | 1.3 |
| | Shore D hardness | 19 | 21 | 24 | 24 | 26 | 28 |
| | Rebound resilience (%) | 63 | 65 | 69 | 70 | 69 | 67 |
| | $Log(E'/E''^2)$ | −5.83 | −5.75 | −5.60 | −5.56 | −5.60 | −5.67 |
| | $T_1$ relaxation time (sec) | 5.4 | 4.7 | 3.7 | 3.5 | 3.7 | 4.2 |
| | Amount of compression deformation | 16.0 | 12.6 | 9.2 | 9.2 | 7.6 | 6.4 |
| | Coefficient of restitution | 0.799 | 0.820 | 0.862 | 0.873 | 0.862 | 0.841 |
| | Shot feeling | Excellent | Excellent | Excellent | Excellent | Excellent | Excellent |

TABLE 6

(Product of content of unsaturated carboxylic acid compound and degree of neutralization)

| | | Example | | | | | |
|---|---|---|---|---|---|---|---|
| | | 1-14 | 1-15 | 1-11 | 1-1 | 1-12 | 1-13 |
| Formulation | BD/AA copolymer (1-1) | — | — | 100.0 | 100.0 | 100.0 | 100.0 |
| | BD/AA copolymer (1-2) | 100.0 | 100.0 | — | — | — | — |
| | Magnesium hydroxide | 0.5 | 1.4 | 4.1 | 5.1 | 10.2 | 15.2 |
| | Cis content (% by mass) | 20 | 20 | 20 | 20 | 20 | 20 |
| | Content of unsaturated carboxylic acid compound (% by mass) | 8 | 8 | 15 | 15 | 15 | 15 |
| Physical properties | Degree of neutralization (%) | 20 | 50 | 80 | 100 | 200 | 300 |
| | Product of content of unsaturated carboxylic acid compound and degree of neutralization | 160 | 400 | 1200 | 1500 | 3000 | 4500 |
| | MFR (g/10 min) | 5.5 | 4.5 | 3.3 | 3.0 | 1.5 | 1.3 |
| | Shore D hardness | 20 | 23 | 24 | 24 | 26 | 28 |
| | Rebound resilience (%) | 63 | 65 | 69 | 70 | 69 | 67 |
| | $Log(E'/E''^2)$ | −5.83 | −5.75 | −5.60 | −5.56 | −5.60 | −5.67 |
| | $T_1$ relaxation time (sec) | 5.4 | 4.7 | 3.7 | 3.5 | 3.7 | 4.2 |
| | Amount of compression deformation | 14.2 | 10.2 | 9.2 | 9.2 | 7.6 | 6.4 |
| | Coefficient of restitution | 0.799 | 0.820 | 0.862 | 0.873 | 0.862 | 0.841 |
| | Shot feeling | Excellent | Excellent | Excellent | Excellent | Excellent | Excellent |

The raw materials shown in Tables 1 to 6 other than the BD/AA copolymers (1-1) to (1-4) are listed below.
NUCREL N1560: Du Pont-Mitsui Polychemicals Co., Ltd., ethylene-methacrylic acid copolymer (methacrylic acid content: 15% by mass)
Polybutadiene rubber: BR730 from JSR Corporation (cis content: 95% by mass)
Magnesium hydroxide: Wako Pure Chemical Industries, Ltd.
Sodium hydroxide; Wako Pure Chemical Industries, Ltd.
Zinc oxide; Sigma Aldrich Corporation
Calcium hydroxide: Tokyo Chemical Industry Co., Ltd.
Lithium hydroxide: Tokyo Chemical Industry Co., Ltd.
Potassium hydroxide: Wako Pure Chemical Industries, Ltd.
Copper hydroxide: Sigma Aldrich Corporation
Iron(III) chloride; Sigma Aldrich Corporation
Zinc acrylate: Sigma Aldrich Corporation As can be seen from the results shown in Tables 1 to 6, the resin compositions of the examples prepared by neutralizing carboxyl groups present in a reaction product of a diene polymer having an α,β-unsaturated carbonyl group at each end and a $C_2$-$C_{18}$ unsaturated carboxylic acid compound exhibited improved flexibility, fluidity, and resilience as compared with the conventional materials in the comparative examples. Moreover, the performance properties could be adjusted by adjusting the content of the unsaturated carboxylic acid compound, the cis content, the kind of inorganic metal compound, the degree of neutralization or the like.

(Preparation of BD/AA Copolymer (2-1) (Cis Content: 20%, Acid Content: 15%))

A polybutadiene (85 parts by mass) obtained by reacting a polybutadiene having an OH group at each end (R-4514T from Idemitsu Kosan Co., Ltd., cis content: 20% by mass) with bromoisobutyric acid bromide by a known method was mixed with t-butyl acrylate (27% by mass). To the mixture were added anisole (200 parts by mass), N,N,N',N'',N''-pentamethyldiethylenetriamine (2.3 parts by mass), copper (I) bromide (2.3 parts by mass), and copper(II) bromide (0.2 parts by mass), and the resulting mixture was heated at 60° C. for 18 hours. After the polymer thus obtained was purified by reprecipitation, tetrahydrofuran (200 parts by mass), trimethylsilyl azide (37 parts by mass), potassium fluoride (20 parts by mass), and tetrafluoroammonium fluoride (2 parts by mass) were added and they were stirred at room temperature for 24 hours. The resulting polymer solution was concentrated by passing it through a silica gel short column, and then tetrahydrofuran (400 parts by mass), dipropargyl ether (4 parts by mass), copper(I) bromide (10 parts by mass), and N,N,N',N'',N''-pentamethyldiethylenetriamine (5 parts by mass) were added, followed by stirring the mixture at room temperature for 24 hours. After the resulting polymer solution was concentrated by passing it through a silica gel short column, methylene chloride (400 parts by mass) and trifluoroacetic acid (50 parts by mass) were added and they were stirred at room temperature for 12 hours. The resulting product was washed with a 10-fold amount of ethanol, dried at 100° C. for at least 16 hours, whereby a BD/AA copolymer (2-1) was prepared.
(Preparation of BD/AA Copolymer (2-2) (Cis Content: 20%, Acid Content: 8%).)

A BD/AA copolymer (2-2) was prepared in the same manner as in the preparation of the copolymer (2-1), except that the amount of the polybutadiene obtained by the reaction of bromoisobutyric acid bromide was changed to 92 parts by mass and the amount of t-butyl acrylate was changed to 14.2 parts by mass.
(Preparation of BD/AA Copolymer (2-3) (Cis Content: 20%, Acid Content: 50%))

A BD/AA copolymer (2-3) was prepared in the same manner as in the preparation of the copolymer (2-1), except that the amount of the polybutadiene obtained by the reaction of bromoisobutyric acid bromide was changed to 50 parts by mass and the amount of t-butyl acrylate was changed to 89 parts by mass.

(Preparation of BD/AA Copolymer (2-4) (Cis Content: 10%, Acid Content: 15%))

A BD/AA copolymer (2-4) was prepared in the same manner as in the preparation of the copolymer (2-1), except that the polybutadiene having an OH group at each end (cis content: 20% by mass) was changed to another polybutadiene having an OH group at each end (G-3000 from Nippon Soda Co., Ltd., cis content: 10% by mass).
[Preparation of Spherical Body (Core) (Except for Comparative Example 2-2 in Table 7)]

The compounding materials shown in Table 7 to 12 were dry-blended, and mixed and extruded into cold water with a twin-screw kneading extruder to form a strand. The extruded strand was cut into pellets with a pelletizer, whereby a pelletized resin composition for golf balls was prepared. The extrusion was performed with a screw diameter of 45 mm, a screw rotation rate of 200 rpm, and a screw L/D ratio of 35. The mixture was heated to 160 to 230° C. in the die of the extruder. The pelletized resin composition for golf balls was injection-molded at 220° C. to prepare a spherical body (core) having a diameter of 40 mm.
[Preparation of Spherical Body (Core) (Comparative Example 2-2 in Table 7)]

A spherical body (core) having a diameter of 40 mm was prepared by kneading the compounding materials shown under Comparative Example 2-2 in Table 7 with a kneading roll, and heat pressing the mixture with upper and lower molds each having a hemispherical cavity at 170° C. for 20 minutes.

TABLE 7

(Comparison with conventional materials)

| | | Example | Comparative Example | |
|---|---|---|---|---|
| | | 2-1 | 2-1 | 2-2 |
| Formulation | BD/AA copolymer (2-1) | 100.0 | — | — |
| | NUCREL N1560 | — | 100.0 | — |
| | Polybutadiene rubber | — | — | 100.0 |
| | Magnesium hydroxide | 5.1 | 5.1 | — |
| | Zinc acrylate | — | — | 30.0 |
| | Cis content (% by mass) | 20 | 0 | 95 |
| | Content of unsaturated carboxylic acid compound (% by mass) | 15 | 15 | — |
| Physical properties | Degree of neutralization (%) | 100 | 100 | — |
| | MFR (g/10 min) | 7.0 | 2.1 | 0.0 |
| | Shore D hardness | 24 | 53 | 25 |
| | Rebound resilience (%) | 69 | 59 | 61 |
| | $Log(E'/E''^2)$ | −5.60 | −5.98 | −5.90 |
| | $T_1$ relaxation time (sec) | 3.7 | 6.8 | 6.1 |
| | Amount of compression deformation | 9.2 | 1.4 | 8.3 |
| | Coefficient of restitution | 0.862 | 0.757 | 0.778 |
| | Shot feeling | Excellent | Poor | Excellent |

TABLE 8

(Content of unsaturated carboxylic acid compound)

| | | Example | | |
|---|---|---|---|---|
| | | 2-2 | 2-1 | 2-3 |
| Formulation | BD/AA copolymer (2-1) | — | 100.0 | — |
| | BD/AA copolymer (2-2) | 100.0 | — | — |
| | BD/AA copolymer (2-3) | — | — | 100.0 |
| | Magnesium hydroxide | 2.7 | 5.1 | 16.9 |
| | Cis content (% by mass) | 20 | 20 | 20 |
| | Content of unsaturated carboxylic acid compound (% by mass) | 8 | 15 | 50 |
| Physical properties | Degree of neutralization (%) | 100 | 100 | 100 |
| | MFR (g/10 min) | 7.8 | 7.0 | 6.0 |

TABLE 8-continued (Content of unsaturated carboxylic acid compound)

|  | Example | | |
|---|---|---|---|
|  | 2-2 | 2-1 | 2-3 |
| Shore D hardness | 23 | 24 | 28 |
| Rebound resilience (%) | 64 | 69 | 67 |
| Log(E'/E''$^2$) | −5.79 | −5.60 | −5.67 |
| T$_1$ relaxation time (sec) | 5.0 | 3.7 | 4.2 |
| Amount of compression deformation | 10.2 | 9.2 | 6.4 |
| Coefficient of restitution | 0.809 | 0.862 | 0.841 |
| Shot feeling | Excellent | Excellent | Excellent |

TABLE 9

(Cis content)

|  |  | Example | | |
|---|---|---|---|---|
|  |  | 2-1 | 2-4 | 2-5 |
| Formulation | BD/AA copolymer (2-1) | 100.0 | 50.0 | — |
|  | BD/AA copolymer (2-4) | — | 50.0 | 100.0 |
|  | Magnesium hydroxide | 5.1 | 5.1 | 5.1 |
|  | Cis content (% by mass) | 20 | 15 | 10 |
|  | Content of unsaturated carboxylic acid compound (% by mass) | 15 | 15 | 15 |
| Physical properties | Degree of neutralization (%) | 100 | 100 | 100 |
|  | MFR (g/10 min) | 7.0 | 6.2 | 5.3 |
|  | Shore D hardness | 24 | 25 | 27 |
|  | Rebound resilience (%) | 69 | 64 | 60 |
|  | Log(E'/E''$^2$) | −5.60 | −5.79 | −5.94 |
|  | T$_1$ relaxation time (sec) | 3.7 | 5.0 | 6.4 |
|  | Amount of compression deformation | 9.2 | 8.3 | 6.9 |
|  | Coefficient of restitution | 0.862 | 0.809 | 0.767 |
|  | Shot feeling | Excellent | Excellent | Excellent |

TABLE 10

(Kind of inorganic metal compound)

|  |  | Example | | | |
|---|---|---|---|---|---|
|  |  | 2-1 | 2-6 | 2-7 | 2-8 |
| Formulation | BD/AA copolymer (2-1) | 100.0 | 100.0 | 100.0 | 100.0 |
|  | Magnesium hydroxide | 5.1 | — | — | — |
|  | Sodium hydroxide | — | 7.1 | — | — |
|  | Zinc oxide | — | — | 7.1 | — |
|  | Calcium hydroxide | — | — | — | 6.5 |
|  | Cis content (% by mass) | 20 | 20 | 20 | 20 |
|  | Content of unsaturated carboxylic acid compound (% by mass) | 15 | 15 | 15 | 15 |
| Physical properties | Degree of neutralization (%) | 100 | 100 | 100 | 100 |
|  | MFR (g/10 min) | 7.0 | 6.1 | 5.0 | 5.7 |
|  | Shore D hardness | 24 | 24 | 25 | 26 |
|  | Rebound resilience (%) | 69 | 67 | 61 | 61 |
|  | Log(E'/E''$^2$) | −5.60 | −5.67 | −5.90 | −5.90 |
|  | T$_1$ relaxation time (sec) | 3.7 | 4.2 | 6.1 | 6.1 |
|  | Amount of compression deformation | 9.2 | 9.2 | 8.3 | 7.6 |
|  | Coefficient of restitution | 0.862 | 0.841 | 0.778 | 0.778 |
|  | Shot feeling | Excellent | Excellent | Excellent | Excellent |

TABLE 11

(Degree of neutralization)

| | | Example | | | | | |
|---|---|---|---|---|---|---|---|
| | | 2-9 | 2-10 | 2-11 | 2-1 | 2-12 | 2-13 |
| Formulation | BD/AA copolymer (2-1) | 100.0 | 100.0 | 100.0 | 100.0 | 100.0 | 100.0 |
| | Magnesium hydroxide | 1.0 | 2.5 | 4.1 | 5.1 | 10.2 | 15.2 |
| | Cis content (% by mass) | 20 | 20 | 20 | 20 | 20 | 20 |
| | Content of unsaturated carboxylic acid compound (% by mass) | 15 | 15 | 15 | 15 | 15 | 15 |
| Physical properties | Degree of neutralization (%) | 20 | 50 | 80 | 100 | 200 | 300 |
| | MFR (g/10 min) | 22.0 | 13.0 | 4.2 | 7.0 | 3.3 | 1.8 |
| | Shore D hardness | 18 | 22 | 25 | 24 | 26 | 29 |
| | Rebound resilience (%) | 62 | 64 | 68 | 69 | 68 | 66 |
| | $Log(E'/E''^2)$ | −5.86 | −5.79 | −5.64 | −5.60 | −5.64 | −5.71 |
| | $T_1$ relaxation time (sec) | 5.7 | 5.0 | 3.9 | 3.7 | 3.9 | 4.5 |
| | Amount of compression deformation | 18.3 | 11.3 | 8.3 | 9.2 | 7.6 | 5.9 |
| | Coefficient of restitution | 0.788 | 0.809 | 0.851 | 0.862 | 0.851 | 0.830 |
| | Shot feeling | Excellent | Excellent | Excellent | Excellent | Excellent | Excellent |

TABLE 12

(Product of content of unsaturated carboxylic acid compound and degree of neutralization)

| | | Example | | | | | |
|---|---|---|---|---|---|---|---|
| | | 2-14 | 2-15 | 2-11 | 2-1 | 2-12 | 2-13 |
| Formulation | BD/AA copolymer (2-1) | — | — | 100.0 | 100.0 | 100.0 | 100.0 |
| | BD/AA copolymer (2-2) | 100.0 | 100.0 | — | — | — | — |
| | Magnesium hydroxide | 0.5 | 1.4 | 4.1 | 5.1 | 10.2 | 15.2 |
| | Cis content (% by mass) | 20 | 20 | 20 | 20 | 20 | 20 |
| | Content of unsaturated carboxylic acid compound (% by mass) | 8 | 8 | 15 | 15 | 15 | 15 |
| Physical properties | Degree of neutralization (%) | 20 | 50 | 80 | 100 | 200 | 300 |
| | Product of content of unsaturated carboxylic acid compound and degree of neutralization | 160 | 400 | 1200 | 1500 | 3000 | 4500 |
| | MFR (g/10 min) | 14.0 | 10.2 | 8.7 | 7.0 | 5.9 | 4.5 |
| | Shore D hardness | 20 | 23 | 24 | 24 | 26 | 28 |
| | Rebound resilience (%) | 60 | 65 | 67 | 69 | 68 | 66 |
| | $Log(E'/E''^2)$ | −5.94 | −5.75 | −5.67 | −5.60 | −5.64 | −5.71 |
| | $T_1$ relaxation time (sec) | 6.4 | 4.7 | 4.2 | 3.7 | 3.9 | 4.5 |
| | Amount of compression deformation | 14.2 | 10.2 | 9.2 | 9.2 | 7.6 | 6.4 |
| | Coefficient of restitution | 0.767 | 0.820 | 0.841 | 0.862 | 0.851 | 0.830 |
| | Shot feeling | Excellent | Excellent | Excellent | Excellent | Excellent | Excellent |

The raw materials shown in Tables 7 to 12 other than the BD/AA copolymers (2-1) to (2-4) are listed below.

NUCREL N1560: Du Pont-Mitsui Polychemicals Co., Ltd., ethylene-methacrylic acid copolymer (methacrylic acid content: 15% by mass)

Polybutadiene rubber: BR730 from JSR Corporation (cis content: 95% by mass)

Magnesium hydroxide: Wake Pure Chemical Industries, Ltd.

Sodium hydroxide: Wake Pure Chemical Industries, Ltd.

Zinc oxide: Sigma Aldrich Corporation

Calcium hydroxide: Tokyo Chemical Industry Co., Ltd.

Potassium hydroxide: Wako Pure Chemical Industries, Ltd.

Zinc acrylate: Sigma Aldrich Corporation

As can be seen from the results shown in Tables 7 to 12, the resin compositions of the examples prepared by neutralizing carboxyl groups present in a reaction product of a diene polymer having a $C_1$-$C_{18}$ halogenated alkane structure at each end and a $C_2$-$C_{18}$ unsaturated carboxylic acid compound exhibited improved flexibility, fluidity, and resilience as compared with the conventional materials in the comparative examples. Moreover, the performance properties could be adjusted by adjusting the content of the unsaturated carboxylic acid compound, the cis content, the kind of inorganic metal compound, the degree of neutralization or the like.

[Preparation of Spherical Body (Core) (Except for Comparative Example 3-2 in Table 13)]

The compounding materials shown in Table 13 to 18 were dry-blended, and mixed and extruded into cold water with a twin-screw kneading extruder to form a strand. The extruded strand was cut into pellets with a pelletizer, whereby a pelletized resin composition for golf balls was prepared. The extrusion was performed with a screw diameter of 45 mm, a screw rotation rate of 200 rpm, and a screw L/D ratio of 35. The mixture was heated to 160 to 230° C. in the die of the extruder. The pelletized resin composition for golf balls was injection-molded at 220° C. to prepare a spherical body (core) having a diameter of 40 mm.

[Preparation of Spherical Body (Core) (Comparative Example 3-2 in Table 13)]

A spherical body (core) having a diameter of 40 mm was prepared by kneading the compounding materials shown under Comparative Example 3-2 in Table 13 with a kneading roll, and heat pressing the mixture with upper and lower molds each having a hemispherical cavity at 170° C. for 20 minutes.

TABLE 13

(Comparison with conventional materials)

|  |  | Example | Comparative Example | | |
|---|---|---|---|---|---|
|  |  | 3-1 | 3-1 | 3-2 | 3-3 |
| Formulation | POLVEST EP MA120 (cis 75%, 4% modified product) | 100.0 | — | — | — |
|  | NUCREL N1560 | — | 100.0 | — | — |
|  | Polybutadiene rubber | — | — | 100.0 | — |
|  | Anhydrous maleic acid-modified TP049 (trans 87%, 4% modified product) | — | — | — | 100.0 |
|  | Magnesium hydroxide | 2.4 | 5.1 | — | 2.4 |
|  | Zinc acrylate | — | — | 30.0 | — |
|  | Distilled water | 2.0 | — | — | 2.0 |
|  | Cis content (% by mass) | 75 | 0 | 95 | 11 |
|  | Content of anhydrous dicarboxylic acid (% by mass) (in Comparative Example 3-1, content of unsaturated carboxylic acid compound (% by mass)) | 4 | 15 | — | 4 |
| Physical properties | Degree of neutralization (%) | 100 | 100 | — | 100 |
|  | MFR (g/10 min) | 6.0 | 2.1 | 0.0 | 0.5 |
|  | Shore D hardness | 26 | 53 | 25 | 51 |
|  | Rebound resilience (%) | 82 | 59 | 61 | 58 |
|  | $\text{Log}(E'/E''^2)$ | −5.10 | −5.98 | −5.90 | −6.02 |
|  | $T_1$ relaxation time (sec) | 1.7 | 6.8 | 6.1 | 7.3 |
|  | Amount of compression deformation | 7.6 | 1.4 | 8.3 | 1.5 |
|  | Coefficient of restitution | 0.929 | 0.757 | 0.778 | 0.746 |
|  | Shot feeling | Excellent | Poor | Excellent | Poor |

TABLE 14

(Content of anhydrous dicarboxylic acid)

|  |  | Example | | | | |
|---|---|---|---|---|---|---|
|  |  | 3-2 | 3-1 | 3-3 | 3-4 | 3-5 |
| Formulation | POLYVEST EP MA120 (2% modified product) | 100.0 | — | — | — | — |
|  | POLYVEST EP MA120 (4% modified product) | — | 100.0 | — | — | — |
|  | POLYVEST EP MA120 (7.5% modified product) | — | — | 100.0 | — | — |
|  | POLYVEST EP MA120 (15% modified product) | — | — | — | 100.0 | — |
|  | POLYVEST EP MA120 (30% modified product) | — | — | — | — | 100.0 |
|  | Magnesium hydroxide | 1.2 | 2.4 | 4.5 | 9.0 | 18.0 |
|  | Distilled water | 2.0 | 2.0 | 2.0 | 2.0 | 2.0 |
|  | Cis content (% by mass) | 75 | 75 | 75 | 75 | 75 |
|  | Content of anhydrous carboxylic acid (% by mass) | 2 | 4 | 7.5 | 15 | 30 |
| Physical properties | Degree of neutralization (%) | 100 | 100 | 100 | 100 | 100 |
|  | MFR (g/10 min) | 7.0 | 6.0 | 5.8 | 3.2 | 1.5 |
|  | Shore D hardness | 23 | 26 | 27 | 32 | 41 |
|  | Rebound resilience (%) | 68 | 82 | 82 | 75 | 69 |
|  | $\text{Log}(E'/E''^2)$ | −5.64 | −5.10 | −5.10 | −5.37 | −5.60 |
|  | $T_1$ relaxation time (sec) | 3.9 | 1.7 | 1.7 | 2.6 | 3.7 |
|  | Amount of compression deformation | 10.2 | 7.6 | 6.9 | 4.6 | 2.6 |
|  | Coefficient of restitution | 0.781 | 0.929 | 0.929 | 0.855 | 0.792 |
|  | Shot feeling | Excellent | Excellent | Excellent | Excellent | Excellent |

TABLE 15

(Cis content)

|  |  | Example | | Comparative Example | |
|---|---|---|---|---|---|
|  |  | 3-6 | 3-1 | 3-3 | 3-4 |
| Formulation | POLYVEST EP MA120 (4% modified product) | 50.0 | — | — | — |
|  | RICON131MA5 (4% modified product) | 50.0 | 100.0 | — | — |
|  | RICON156MA17 (15% modified product) | — | — | — | 100.0 |
|  | Anhydrous maleic acid-modified TP049 (trans 87%, 4% modified product) | — | — | 100.0 | — |
|  | Magnesium hydroxide | 2.4 | 2.4 | 2.4 | 9.0 |
|  | Distilled water | 2.0 | 2.0 | 2.0 | 2.0 |
|  | Cis content (% by mass) | 55 | 75 | 11 | 15 |
|  | Content of anhydrous dicarboxylic acid (% by mass) | 4 | 4 | 4 | 15 |

TABLE 15-continued (Cis content)

|  |  | Example | | Comparative Example | |
|---|---|---|---|---|---|
|  |  | 3-6 | 3-1 | 3-3 | 3-4 |
| Physical properties | Degree of neutralization (%) | 100 | 100 | 100 | 100 |
|  | MFR (g/10 min) | 5.5 | 6.0 | 0.5 | 1.3 |
|  | Shore D hardness | 30 | 26 | 51 | 44 |
|  | Rebound resilience (%) | 73 | 82 | 58 | 52 |
|  | Log(E'/E''$^2$) | −5.45 | −5.10 | −6.02 | −6.24 |
|  | T$_1$ relaxation time (sec) | 2.9 | 1.7 | 7.3 | 10.5 |
|  | Amount of compression deformation | 5.4 | 7.6 | 1.5 | 2.2 |
|  | Coefficient of restitution | 0.834 | 0.929 | 0.746 | 0.613 |
|  | Shot feeling | Excellent | Excellent | Poor | Poor |

TABLE 16

(Kind of inorganic metal compound)

|  |  | Example | | | |
|---|---|---|---|---|---|
|  |  | 3-1 | 3-7 | 3-8 | 3-9 |
| Formulation | POLYVEST EP MA120 (4% modified product) | 100.0 | 100.0 | 100.0 | 100.0 |
|  | Magnesium hydroxide | 2.4 | — | — | — |
|  | Sodium hydroxide | — | 3.3 | — | — |
|  | Zinc oxide | — | — | 3.4 | — |
|  | Calcium hydroxide | — | — | — | 3.0 |
|  | Distilled water | 2.0 | 2.0 | 2.0 | 2.0 |
|  | Cis content (% by mass) | 75 | 75 | 75 | 75 |
|  | Content of anhydrous dicarboxylic acid (% by mass) | 4 | 4 | 4 | 4 |
| Physical Properties | Degree of neutralization (%) | 100 | 100 | 100 | 100 |
|  | MFR (g/10 min) | 6.0 | 5.5 | 4.8 | 3.6 |
|  | Shore D hardness | 26 | 26 | 29 | 34 |
|  | Rebound resilience (%) | 82 | 80 | 73 | 71 |
|  | Log(E'/E''$^2$) | −5.10 | −5.18 | −5.45 | −5.52 |
|  | T$_1$ relaxation time (sec) | 1.7 | 1.9 | 2.9 | 3.3 |
|  | Amount of compression deformation | 7.6 | 7.6 | 5.9 | 4.0 |
|  | Coefficient of restitution | 0.929 | 0.908 | 0.834 | 0.813 |
|  | Shot feeling | Excellent | Excellent | Excellent | Excellent |

TABLE 17

(Degree of neutralization)

|  |  | Example | | | | | |
|---|---|---|---|---|---|---|---|
|  |  | 3-10 | 3-11 | 3-12 | 3-1 | 3-13 | 3-14 |
| Formulation | POLYVEST EP MA120 (4% modified product) | 100.0 | 100.0 | 100.0 | 100.0 | 100.0 | 100.0 |
|  | Magnesium hydroxide | 0.5 | 1.2 | 1.9 | 2.4 | 4.8 | 7.2 |
|  | Distilled water | 2.0 | 2.0 | 2.0 | 2.0 | 2.0 | 2.0 |
|  | Cis content (% by mass) | 75 | 75 | 75 | 75 | 75 | 75 |
|  | Content of anhydrous dicarboxylic acid (% by mass) | 4 | 4 | 4 | 4 | 4 | 4 |
| Physical properties | Degree of neutralization (%) | 20 | 50 | 80 | 100 | 200 | 300 |
|  | MFR (g/10 min) | 17.0 | 11.0 | 3.3 | 6.0 | 1.6 | 1.3 |
|  | Shore D hardness | 20 | 23 | 26 | 26 | 29 | 35 |
|  | Rebound resilience (%) | 67 | 75 | 81 | 82 | 82 | 71 |
|  | Log(E'/E''$^2$) | −5.67 | −5.37 | −5.14 | −5.10 | −5.10 | −5.52 |
|  | T$_1$ relaxation time (sec) | 4.2 | 2.6 | 1.8 | 1.7 | 1.7 | 3.3 |
|  | Amount of compression deformation | 14.2 | 10.2 | 7.6 | 7.6 | 5.9 | 3.7 |
|  | Coefficient of restitution | 0.771 | 0.855 | 0.918 | 0.929 | 0.929 | 0.813 |
|  | Shot feeling | Excellent | Excellent | Excellent | Excellent | Excellent | Excellent |

TABLE 18

(Product of content of anhydrous dicarboxylic acid and degree of neutralization)

|  |  | Example | | | | | |
|---|---|---|---|---|---|---|---|
|  |  | 3-10 | 3-11 | 3-1 | 3-3 | 3-15 | 3-16 |
| Formulation | POLYVEST EP MA120 (4% modified product) | 100.0 | 100.0 | 100.0 | — | — | — |
|  | POLYVEST EP MA120 (7.5% modified product) | — | — | — | 100.0 | 100.0 | — |
|  | POLYVEST EP MA120 (15% modified product) | — | — | — | — | — | 100.0 |
|  | Magnesium hydroxide | 0.5 | 1.2 | 2.4 | 4.5 | 9.0 | 27.0 |
|  | Distilled water | 2.0 | 2.0 | 2.0 | 2.0 | 2.0 | 2.0 |
|  | Cis content (% by mass) | 75 | 75 | 75 | 75 | 75 | 75 |
|  | Content of anhydrous dicarboxylic acid (% by mass) | 4 | 4 | 4 | 7.5 | 7.5 | 15 |
| Physical properties | Degree of neutralization (%) | 20 | 50 | 100 | 100 | 200 | 300 |
|  | Product of content of anhydrous dicarboxylic acid and degree of neutralization | 80 | 200 | 400 | 750 | 1500 | 4500 |
|  | MFR (g/10 min) | 17.0 | 11.0 | 6.0 | 5.8 | 5.4 | 2.9 |
|  | Shore D hardness | 20 | 23 | 26 | 27 | 30 | 36 |
|  | Rebound resilience (%) | 67 | 75 | 82 | 82 | 79 | 70 |
|  | Log(E'/E''$^2$) | −5.67 | −5.37 | −5.10 | −5.10 | −5.22 | −5.56 |
|  | $T_1$ relaxation time (sec) | 4.2 | 2.6 | 1.7 | 1.7 | 2.0 | 3.5 |
|  | Amount of compression deformation | 14.2 | 10.2 | 7.6 | 6.9 | 5.4 | 3.5 |
|  | Coefficient of restitution | 0.771 | 0.855 | 0.929 | 0.929 | 0.897 | 0.803 |
|  | Shot feeling | Excellent | Excellent | Excellent | Excellent | Excellent | Excellent |

The raw materials shown in Tables 13 to 18 are listed below.

POLYVEST EP MA120: Evonik Japan Co., Ltd., maleic anhydride-modified polybutadiene (cis content: 75% by mass, anhydrous dicarboxylic acid content: 2 to 30% by mass)

RICON131MA5: Clay Valley, maleic anhydride-modified polybutadiene (cis content: 35% by mass)

RICON156MA17: Clay Valley, maleic anhydride-modified polybutadiene (cis content: 15% by mass)

Anhydrous maleic acid-modified TPO49: product obtained by grafting anhydrous maleic acid onto TPO49 (Asahi Kasei Corporation, trans polybutadiene) by a known method (as disclosed in JP 2001-72726 A, JP H06-4751 B (which are incorporated by reference in the entirety), etc.) (cis content: 11% by mass, trans content: 87% by mass, anhydrous dicarboxylic acid content: 4% by mass)

NUCREL N1560: Du Pont-Mitsui Polychemicals Co., Ltd., ethylene-methacrylic acid copolymer (methacrylic acid content: 15% by mass)

Polybutadiene rubber: BR730 from JSR Corporation (cis content: 95% by mass)

Magnesium hydroxide: Wako Pure Chemical Industries, Ltd.

Sodium hydroxide: Wako Pure Chemical Industries, Ltd.

Zinc oxide: Sigma Aldrich Corporation

Calcium hydroxide: Tokyo Chemical Industry Co., Ltd.

Potassium hydroxide: Wako Pure Chemical Industries, Ltd.

Zinc acrylate: Sigma Aldrich Corporation

Distilled water: Wako Pure Chemical Industries, Ltd.

As can be seen from the results shown in Tables 13 to 18, the resin compositions of the examples prepared by neutralizing (anhydrous) dicarboxyl groups present in a diene polymer that contained an (anhydrous) dicarboxylic acid grafted on an end and/or side chain thereof and had a 1,4-cis structure content of at least 41% by mass exhibited improved flexibility, fluidity, and resilience as compared with the conventional materials in the comparative examples. Moreover, the performance properties could be adjusted by adjusting the content of (anhydrous) dicarboxylic acid, the cis content, the kind of inorganic metal compound, the degree of neutralization or the like.

[Preparation of Spherical Body (Core) (Except for Comparative Example 4-5 in Table 19)]

The components (B) and (C) in amounts shown in Table 19 to 22 were kneaded with a twin-screw kneading extruder at 200° C. for 15 minutes. Then, the component (A) was added to the mixture and kneaded at 100 to 170° C. for 15 minutes. Then, the kneaded mixture was extruded into cold water to form a strand. The extruded strand was cut into pellets with a pelletizer, whereby a pelletized resin composition for golf balls was prepared. The extrusion was performed with a screw diameter of 45 mm, a screw rotation rate of 200 rpm, and a screw L/D ratio of 35. The mixture was heated to 160 to 230° C. in the die of the extruder. The pelletized resin composition for golf balls was injection-molded at 220° C. to prepare a spherical body (core) having a diameter of 40 mm.

[Preparation of Spherical Body (Core) (Comparative Example 4-5 in Table 19)]

A spherical body (core) having a diameter of 40 mm was prepared by kneading the compounding materials shown under Comparative Example 4-5 in Table 19 with a kneading roll, and heat pressing the mixture with upper and lower molds each having a hemispherical cavity at 170° C. for 20 minutes.

TABLE 19

(Effect of component (A) added)

| | | Example | | | Comparative Example | | | | |
|---|---|---|---|---|---|---|---|---|---|
| | | 4-1 | 4-2 | 4-3 | 4-1 | 4-2 | 4-3 | 4-4 | 4-5 |
| Formulation | (A) POLYVEST EP MA120 (Cis 75%, 4% modified product) | 15.0 | 15.0 | 15.0 | — | — | — | — | — |
| | (A) Anhydrous maleic acid-modified TP049 (trans 87%, 4% modified product) | — | — | — | 15.0 | — | — | — | — |
| | (B) NUCREL N1560 | 100.0 | — | — | 100.0 | 100.0 | — | — | — |
| | (B) NUCREL AN4319 | — | 100.0 | — | — | — | 100.0 | — | — |
| | (B) NUCREL N2060 | — | — | 100.0 | — | — | — | 100.0 | — |
| | Polybutadiene rubber | — | — | — | — | — | — | — | 100.0 |
| | (C) Magnesium hydroxide | 5.1 | 2.7 | 6.8 | 5.1 | 5.1 | 2.7 | 6.8 | — |
| | Zinc acrylate | — | — | — | — | — | — | — | 30 |
| | Cis content of (A)(% by mass) | 75 | 75 | 75 | 11 | — | — | — | — |
| | Content of anhydrous dicarboxylic acid in (A) (% by mass) | 4 | 4 | 4 | 4 | — | — | — | — |
| | Content of unsaturated carboxylic acid in (B) (% by mass) | 15 | 8 | 20 | 15 | 15 | 8 | 20 | — |
| Physical properties | Degree of neutralization of (B) (%) | 100 | 100 | 100 | 100 | 100 | 100 | 100 | — |
| | MFR (g/10 min) | 3.0 | 4.0 | 1.5 | 0.7 | 2.1 | 3.2 | 1.0 | 0.0 |
| | Shore D hardness | 48 | 44 | 51 | 57 | 55 | 50 | 62 | 25 |
| | Rebound resilience (%) | 71 | 69 | 70 | 60 | 59 | 58 | 59 | 65 |
| | $Log(E'/E''^2)$ | −5.52 | −5.60 | −5.56 | −5.94 | −5.98 | −6.02 | −5.98 | −5.75 |
| | $T_1$ relaxation time (sec) | 3.3 | 3.7 | 3.5 | 6.4 | 6.8 | 7.3 | 6.8 | 4.7 |
| | Amount of compression deformation | 1.8 | 2.2 | 1.5 | 1.2 | 1.3 | 1.6 | 1.0 | 8.3 |
| | Coefficient of restitution | 0.883 | 0.862 | 0.873 | 0.767 | 0.757 | 0.746 | 0.757 | 0.820 |
| | Shot feeling | Excellent | Excellent | Excellent | Poor | Poor | Poor | Poor | Excellent |

TABLE 20

(Amount of component (A))

| | | Example | | | |
|---|---|---|---|---|---|
| | | 4-1 | 4-4 | 4-5 | 4-6 |
| Formulation | (A) POLYVEST EP MA120 (cis 75%, 4% modified product) | 15.0 | 5.0 | 50.0 | 70.0 |
| | (B) NUCREL N1560 | 100.0 | 100.0 | 100.0 | 100.0 |
| | (C) Magnesium hydroxide | 5.1 | 3.1 | 7.1 | 5.1 |
| | Content of unsaturated carboxylic acid in (B) (% by mass) | 15 | 15 | 15 | 15 |
| Physical properties | Degree of neutralization of (B) (%) | 100 | 150 | 150 | 150 |
| | MFR (g/10 min) | 3.0 | 2.1 | 3.5 | 4.0 |
| | Shore D hardness | 48 | 53 | 30 | 20 |
| | Rebound resilience (%) | 71 | 61 | 72 | 74 |
| | $Log(E'/E''^2)$ | −5.52 | −5.90 | −5.48 | −5.41 |
| | $T_1$ relaxation time (sec) | 3.3 | 6.1 | 3.1 | 2.7 |
| | Amount of compression deformation | 1.8 | 1.4 | 5.4 | 14.2 |
| | Coefficient of restitution | 0.883 | 0.778 | 0.894 | 0.915 |
| | Shot feeling | Excellent | Excellent | Excellent | Excellent |

TABLE 21

(Product of content of unsaturated carboxylic acid and degree of neutralization in component (B))

| | | Example | | | | |
|---|---|---|---|---|---|---|
| | | 4-7 | 4-8 | 4-1 | 4-9 | 4-10 |
| Formulation | (A) POLYVEST EP MA120 (cis 75%, 4% modified product) | 20.0 | 20.0 | 15.0 | 20.0 | 20.0 |
| | (B) NUCREL N1560 | 100.0 | 100.0 | 100.0 | 100.0 | 100.0 |
| | (C) Magnesium hydroxide | 2.6 | 4.1 | 5.1 | 10.2 | 17.9 |
| | Content of unsaturated carboxylic acid in (B) (% by mass) | 15 | 15 | 15 | 15 | 15 |
| Physical properties | Degree of neutralization of (B) (%) | 50 | 80 | 100 | 200 | 350 |
| | Product of content of unsaturated carboxylic acid and degree of neutralization in component (B) | 750 | 1200 | 1500 | 3000 | 5250 |
| | MFR (g/10 min) | 4.1 | 3.7 | 3.0 | 2.2 | 2.1 |
| | Shore D hardness | 40 | 46 | 48 | 53 | 55 |

TABLE 21-continued (Product of content of unsaturated carboxylic acid and degree of neutralization in component (B))

| | | Example | | | | |
|---|---|---|---|---|---|---|
| | | 4-7 | 4-8 | 4-1 | 4-9 | 4-10 |
| Rebound resilience (%) | | 60 | 71 | 71 | 67 | 61 |
| Log(E'/E"$^2$) | | −5.94 | −5.52 | −5.52 | −5.67 | −5.90 |
| $T_1$ relaxation time (sec) | | 6.4 | 3.3 | 3.3 | 4.2 | 6.1 |
| Amount of compression deformation | | 2.7 | 1.9 | 1.8 | 1.4 | 1.3 |
| Coefficient of restitution | | 0.767 | 0.883 | 0.883 | 0.841 | 0.778 |
| Shot feeling | | Excellent | Excellent | Excellent | Excellent | Excellent |

TABLE 22

(Kind of Inorganic metal compound)

| | | Example | | | | |
|---|---|---|---|---|---|---|
| | | 4-1 | 4-11 | 4-12 | 4-13 | 4-14 |
| Formulation | (A) POLYVEST EP MA120 (cis 75%, 4% modified product) | 15.0 | 15.0 | 15.0 | 15.0 | 15.0 |
| | (B) NUCREL N1560 | 100.0 | 100.0 | 100.0 | 100.0 | 100.0 |
| | (C) Magnesium hydroxide | 5.1 | — | — | — | — |
| | (C) Sodium hydroxide | — | 6.9 | — | — | — |
| | (C) zinc oxide | — | — | 7.1 | — | — |
| | (C) Calcium hydroxide | — | — | — | 6.5 | — |
| | (C) Potassium hydroxide | — | — | — | — | 9.8 |
| Content of unsaturated carboxylic acid in (B) (% by mass) | | 15 | 15 | 15 | 15 | 15 |
| Physical properties | Degree of neutralization of (B) (%) | 100 | 100 | 100 | 100 | 100 |
| | MFR (g/10 min) | 3.0 | 3.1 | 2.9 | 2.9 | 3.1 |
| | Shore D hardness | 48 | 47 | 52 | 54 | 50 |
| | Rebound resilience (%) | 71 | 70 | 67 | 64 | 65 |
| | Log(E'/E"$^2$) | −5.52 | −5.56 | −5.67 | −5.79 | −5.75 |
| | $T_1$ relaxation time (sec) | 3.3 | 3.5 | 4.2 | 5.0 | 4.7 |
| | Amount of compression deformation | 1.8 | 1.9 | 1.5 | 1.3 | 1.6 |
| | Coefficient of restitution | 0.883 | 0.873 | 0.841 | 0.809 | 0.820 |
| | Shot feeling | Excellent | Excellent | Excellent | Excellent | Excellent |

The raw materials shown in Tables 19 to 22 are listed below.
POLYVEST EP MA120: Evonik Japan Co., Ltd., maleic anhydride-modified polybutadiene (cis content: 75% by mass, anhydrous dicarboxylic acid content: 4% by mass)
Anhydrous maleic acid-modified TPO49: product obtained by grafting anhydrous maleic acid onto 72049 (Asahi Kasai Corporation, trans polybutadiene) by a known method (as disclosed in JP 2001-72726 A, JP H06-4751 B (which are incorporated by reference in the entirety), etc.) (cis content: 11% by mass, trans content: 87% by mass, anhydrous dicarboxylic acid content: 4% by mass)
NUCREL N1560: Du Pont-Mitsui Polychemicals Co., Ltd., ethylene-methacrylic acid copolymer (methacrylic acid content: 15% by mass)
NUCREL AN4319: Du Pont-Mitsui Polychemicals Co., Ltd., ethylene-methacrylic acid-acrylic acid ester copolymer (methacrylic acid content: 8% by mass)
NUCREL N2060: Du Pont-Mitsui Polychemicals Co., Ltd., ethylene-methacrylic acid copolymer (methacrylic acid content: 20% by mass)
Polybutadiene rubber: BR730 from JSR Corporation (cis content: 95% by mass)
Magnesium hydroxide: Wako Pure Chemical Industries, Ltd.
Sodium hydroxide: Wake Pure Chemical Industries, Ltd.
Zinc oxide: Sigma Aldrich Corporation
Calcium hydroxide: Tokyo Chemical Industry Co., Ltd.
Potassium hydroxide: Wake Pure Chemical Industries, Ltd.
Zinc acrylate: Sigma Aldrich Corporation As can be seen from the results shown in Tables 19 to 22, the resin compositions of the examples containing as the component (A) a diene polymer that contained an (anhydrous) dicarboxylic acid grafted on an end and/or side chain thereof and had a 1,4-cis structure content of at least 41% by mass exhibited improved flexibility, fluidity, and resilience as compared with the resin compositions of the comparative examples not containing the component (A). Moreover, the performance properties could be adjusted by adjusting the amount of component (A), the degree of neutralization of the component (B), the kind of inorganic metal compound or the like.

[Preparation of Spherical Body (Core) (Except for Comparative Example 5-2 in Table 23)]

The compounding materials shown in Table 23 to 27 were dry-blended (but in Examples 5-1 to 5-16, before dry-blending all the compounding materials, only the components (A) and (B) were previously kneaded and reacted at 135° C. for four hours to give a reaction mixture, which was then used), and mixed and extruded into cold water with a twin-screw kneading extruder to form a strand. The extruded strand was cut into pellets with a pelletizer, whereby a pelletized resin composition for golf balls was prepared. The extrusion was performed with a screw diameter of 45 mm, a screw rotation rate of 200 rpm, and a screw L/D ratio of 35. The mixture was heated to 160 to 230° C. in the die of the extruder. The pelletized resin composition for golf balls was injection-molded at 220° C. to prepare a spherical body (core) having a diameter of 40 mm.

[Preparation of Spherical Body (Core) (Comparative Example 5-2 in Table 23)]

A spherical body (core) having a diameter of 40 mm was prepared by kneading the compounding materials shown under Comparative Example 5-2 in Table 23 with a kneading roll, and heat pressing the mixture with upper and lower molds each having a hemispherical cavity at 170° C. for 20 minutes.

[Amount of Carboxyl Groups and Anhydrous Dicarboxyl Groups]

The amount (% by mass) of carboxyl groups and anhydrous dicarboxyl groups was calculated as described below.

Amount of carboxyl groups (% by mass)=(2× (([moles of anhydrous dicarboxyl groups in grafted diene polymer]−[moles of diol compound])+([moles of died compound]×[number of carboxyl groups per molecule of diol compound]))×6,005/[weight (g) of reaction product]

1 One anhydrous dicarboxyl group is counted as two carboxyl groups in the calculation of the amount (% by mass).

2 A carboxyl group is considered to have the same molecular weight as acetic acid ($CH_3COOH$) in the calculation of the amount (% by mass).

TABLE 23

(Comparison with conventional materials)

| | | Example | Comparative Example | |
|---|---|---|---|---|
| | | 5-1 | 5-1 | 5-2 |
| Formulation | (A) POLYVEST EP MA120 (4% modified product) | 100.0 | — | — |
| | (B) Dimethylol butyric acid | 2.9 | — | — |
| | NUCREL N1560 | — | 100.0 | — |
| | Polybutadiene rubber | — | — | 100.0 |
| | Magnesium hydroxide | 1.8 | 5.1 | — |
| | Zinc acrylate | — | — | 30.0 |
| | Distilled water | 2.0 | 2.0 | 2.0 |
| | Cis content (% by mass) | 75 | 0 | 95 |
| | Amount of carboxyl groups and anhydrous dicarboxyl groups (% by mass) | 6.1 | 15 | — |
| | Ratio (molar equivalents) of diol compound (B) introduced per anhydrous dicarboxyl group of (A) | 0.48 | — | — |
| Physical properties | Degree of neutralization (%) | 100 | 100 | — |
| | MFR (g/10 min) | 3.0 | 2.1 | 0.0 |
| | Shore D hardness | 25 | 53 | 25 |
| | Rebound resilience (%) | 86 | 59 | 61 |
| | Log($E'/E''^2$) | −4.95 | −5.98 | −5.90 |
| | $T_1$ relaxation time (sec) | 1.3 | 6.8 | 6.1 |
| | Amount of compression deformation | 8.3 | 1.4 | 8.3 |
| | Coefficient of restitution | 0.971 | 0.757 | 0.778 |
| | Shot feeling | Excellent | Poor | Excellent |

TABLE 24

(Comparison of diol compounds)

| | | Example | | | | |
|---|---|---|---|---|---|---|
| | | 5-2 | 5-3 | 5-1 | 5-4 | 5-5 |
| Formulation | (A) POLYVEST EP MA120 (2% modified product) | 100.0 | 100.0 | 100.0 | 100.0 | 100.0 |
| | (B) Ethylene glycol | 1.2 | — | — | — | — |
| | (B) 1,4-Butanediol | — | 1.8 | — | — | — |
| | (B) Dimethylol butyric acid | — | — | 2.9 | — | — |
| | (B) Dimethylol propionic acid | — | — | — | 2.6 | — |
| | (B) Triethylene glycol | — | — | — | — | 2.9 |
| | Magnesium hydroxide | 2.2 | 2.1 | 1.8 | 1.7 | 1.2 |
| | Distilled water | 2.0 | 2.0 | 2.0 | 2.0 | 2.0 |
| | Cis content (% by mass) | 75 | 75 | 75 | 75 | 75 |
| | Amount of carboxyl groups and anhydrous dicarboxyl groups.(% by mass) | 4.1 | 4.1 | 6.1 | 6.1 | 4.0 |
| | Ratio (molar equivalents) of diol compound (B) introduced per anhydrous dicarboxyl group of (A) | 0.48 | 0.48 | 0.48 | 0.48 | 0.48 |
| Physical properties | Degree of neutralization (%) | 100 | 100 | 100 | 100 | 100 |
| | MFR (g/10 min) | 2.8 | 4.2 | 3.0 | 2.9 | 3.5 |
| | Shore D hardness | 28 | 23 | 25 | 27 | 21 |
| | Rebound resilience (%) | 79 | 84 | 86 | 83 | 80 |
| | Log($E'/E''^2$) | −5.22 | −5.03 | −4.95 | −5.06 | −5.18 |
| | $T_1$ relaxation time (sec) | 2.0 | 1.5 | 1.3 | 1.6 | 1.9 |
| | Amount of compression deformation | 6.4 | 10.2 | 8.3 | 6.9 | 12.6 |
| | Coefficient of restitution | 0.897 | 0.950 | 0.971 | 0.939 | 0.908 |
| | Shot feeling | Excellent | Excellent | Excellent | Excellent | Excellent |

TABLE 25

(Ratio of diol compound introduced)

|  |  | Example | | | |
|---|---|---|---|---|---|
|  |  | 5-6 | 5-7 | 5-1 | 5-8 |
| Formulation | (A) POLYVEST EP MA120 (2% modified product) | 100.0 | 100.0 | 100.0 | 100.0 |
|  | (B) Dimethylol butyric acid | 0.8 | 1.2 | 2.9 | 3.3 |
|  | Magnesium hydroxide | 2.2 | 2.1 | 1.8 | 1.7 |
|  | Distilled water | 2.0 | 2.0 | 2.0 | 2.0 |
|  | Cis content (% by mass) | 75 | 75 | 75 | 75 |
|  | Amount of carboxyl groups and anhydrous dicarboxyl groups (% by mass) | 7.5 | 7.2 | 6.1 | 5.8 |
|  | Ratio (molar equivalents) of diol compound (B) introduced per anhydrous dicarboxyl group of (A) | 0.25 | 0.2 | 0.48 | 0.55 |
| Physical properties | Degree of neutralization (%) | 100 | 100 | 100 | 100 |
|  | MFR (g/10 min) | 5.0 | 4.1 | 3.0 | 2.7 |
|  | Shore D hardness | 23 | 24 | 25 | 26 |
|  | Rebound resilience (%) | 84 | 84 | 86 | 86 |
|  | $\mathrm{Log}(E'/E''^2)$ | −5.03 | −5.03 | −4.95 | −4.95 |
|  | $T_1$ relaxation time (sec) | 1.5 | 1.5 | 1.3 | 1.3 |
|  | Amount of compression deformation | 10.2 | 9.2 | 8.3 | 7.6 |
|  | Coefficient of restitution | 0.950 | 0.950 | 0.971 | 0.971 |
|  | Shot feeling | Excellent | Excellent | Excellent | Excellent |

TABLE 26

(Degree of neutralization)

|  |  | Example | | | | | |
|---|---|---|---|---|---|---|---|
|  |  | 5-9 | 5-10 | 5-11 | 5-1 | 5-12 | 5-13 |
| Formulation | (A) POLYVEST EP MA120 (4% modified product) | 100.0 | 100.0 | 100.0 | 100.0 | 100.0 | 100.0 |
|  | (B) Dimethylol butyric acid | 2.9 | 2.9 | 2.9 | 2.9 | 2.9 | 2.9 |
|  | Magnesium hydroxide | 0.4 | 0.9 | 1.5 | 1.8 | 3.6 | 5.4 |
|  | Distilled water | 2.0 | 2.0 | 2.0 | 2.0 | 2.0 | 2.0 |
|  | Cis content (% by mass) | 75 | 75 | 75 | 75 | 75 | 75 |
|  | Amount of carboxyl groups and anhydrous dicarboxyl groups (% by mass) | 4 | 4 | 4 | 4 | 4 | 4 |
|  | Ratio (molar equivalents) of diol compound (B) introduced per anhydrous dicarboxyl group of (A) | 0.48 | 0.48 | 0.48 | 0.48 | 0.48 | 0.48 |
| Physical properties | Degree of neutralization (%) | 20 | 50 | 80 | 100 | 200 | 300 |
|  | MFR (g/10 min) | 6.7 | 4.5 | 3.3 | 3.0 | 2.9 | 2.1 |
|  | Shore D hardness | 20 | 21 | 24 | 25 | 28 | 32 |
|  | Rebound resilience (%) | 78 | 81 | 85 | 86 | 83 | 77 |
|  | $\mathrm{Log}(E'/E''^2)$ | −5.26 | −5.14 | −4.99 | −4.95 | −5.06 | −5.29 |
|  | $T_1$ relaxation time (sec) | 2.1 | 1.8 | 1.4 | 1.3 | 1.6 | 2.3 |
|  | Amount of compression deformation | 14.2 | 12.6 | 9.2 | 8.3 | 6.4 | 4.6 |
|  | Coefficient of restitution | 0.887 | 0.918 | 0.960 | 0.971 | 0.939 | 0.876 |
|  | Shot feeling | Excellent | Excellent | Excellent | Excellent | Excellent | Excellent |

TABLE 27

(Kind of inorganic metal compound)

|  |  | Example | | | |
|---|---|---|---|---|---|
|  |  | 5-1 | 5-14 | 5-15 | 5-16 |
| Formulation | (A) POLYVEST EP MA120 (4% modified product) | 100.0 | 100.0 | 100.0 | 100.0 |
|  | (B) Dimethylol butyric acid | 2.9 | 2.9 | 2.9 | 2.9 |
|  | Magnesium hydroxide | 1.8 | — | — | — |
|  | Sodium hydroxide | — | 2.5 | — | — |
|  | Zinc oxide | — | — | 2.6 | — |
|  | Calcium hydroxide | — | — | — | 1.4 |
|  | Distilled water | 2.0 | 2.0 | 2.0 | 2.0 |
|  | Cis content (% by mass) | 75 | 75 | 75 | 75 |
|  | Amount of carboxyl groups and anhydrous dicarboxyl groups (% by mass) | 6.1 | 6.1 | 6.1 | 6.1 |
|  | Ratio (molar equivalents) of diol compound (B) introduced per anhydrous dicarboxyl group of (A) | 0.48 | 0.48 | 0.48 | 0.48 |
| Physical properties | Degree of neutralization (%) | 100 | 100 | 100 | 100 |
|  | MFR (g/10 min) | 3.0 | 3.1 | 2.7 | 2.5 |
|  | Shore D hardness | 25 | 24 | 26 | 24 |

TABLE 27-continued (Kind of inorganic metal compound)

| | Example | | | |
|---|---|---|---|---|
| | 5-1 | 5-14 | 5-15 | 5-16 |
| Rebound resilience (%) | 86 | 84 | 83 | 83 |
| $Log(E'/E''^2)$ | −4.95 | −5.03 | −5.06 | −5.06 |
| $T_1$ relaxation time (sec) | 1.3 | 1.5 | 1.6 | 1.6 |
| Amount of compression deformation | 8.3 | 9.2 | 7.6 | 9.2 |
| Coefficient of restitution | 0.971 | 0.950 | 0.939 | 0.939 |
| Shot feeling | Excellent | Excellent | Excellent | Excellent |

The raw materials shown in Tables 23 to 27 are listed below.

POLYVEST EP MA120: Evonik Japan Co., Ltd., maleic anhydride-modified polybutadiene (cis content: 75% by mass, anhydrous dicarboxylic acid content: 2 to 30% by mass)

NUCREL N1560: Du Pont-Mitsui Polychemicals Co., Ltd., ethylene-methacrylic acid copolymer (methacrylic acid content: 15% by mass)

Polybutadiene rubber; BR730 from JSR Corporation (cis content: 95% by mass)

Dimethylol butyric acid: Tokyo Chemical Industry Co., Ltd.
Ethylene glycol: Tokyo Chemical Industry Co., Ltd.
1,4-butanediol: Tokyo Chemical Industry Co., Ltd.
Dimethylol propionic acid: Tokyo Chemical Industry Co., Ltd.
Triethylene glycol: Tokyo Chemical Industry Co., Ltd.
Magnesium hydroxide: Wako Pure Chemical Industries, Ltd.
sodium hydroxide: Wako Pure Chemical Industries, Ltd.
Zinc oxide: Sigma Aldrich Corporation
Calcium hydroxide: Tokyo Chemical Industry Co., Ltd.
Zinc acrylate: Sigma Aldrich Corporation
Distilled water: Wako Pure Chemical Industries, Ltd.

As can be seen from the results shown in Tables 23 to 27, the resin compositions of the examples prepared by neutralizing carboxyl groups and (anhydrous) dicarboxyl groups present in a reaction product of a dial compound and a diene polymer containing an (anhydrous) dicarboxylic acid grafted on an end and/or side chain thereof exhibited improved flexibility, fluidity, and resilience as compared with the conventional materials in the comparative examples. Moreover, the performance properties could be adjusted by adjusting the kind of diol compound, the amount of diol compound introduced, the degree of neutralization, the kind of inorganic metal compound or the like.

INDUSTRIAL APPLICABILITY

The present invention enables the preparation of a resin composition for golf balls which has excellent resilience, flexibility, and fluidity, and the use of the resin composition provides golf balls that are excellent in resilience, shot feeling, and productivity.

The invention claimed is:

1. A golf ball, formed from a resin composition for golf balls, comprising:
   a polymer that contains a diene polymer moiety and a carboxylic acid-based moiety wherein carboxyl groups derived from the carboxylic acid-based moiety are neutralized,
   wherein the diene polymer moiety has a cis content of at least 20% by mass, and
   wherein the resin composition has a melt flow rate (190° C., 2.16 kg) of 1.0 g/10 min or higher,
   wherein the polymer is obtained by neutralizing (anhydrous) dicarboxyl groups contained in a diene polymer that contains an (anhydrous) dicarboxylic acid grafted thereon and has a 1,4-cis structure content of at least 41% by mass,
   wherein the polymer has a content of the (anhydrous) dicarboxylic acid of 2 to 30% by mass, a degree of neutralization of the (anhydrous) dicarboxyl groups of 50 to 300%, and a product of the content of the (anhydrous) dicarboxylic acid and the degree of neutralization of the (anhydrous) dicarboxyl groups of 200 to 3000.

2. The golf ball according to claim 1,
   wherein the carboxyl groups are neutralized with at least one metal ion selected from the group consisting of $Na^+$, $Mg^{2+}$, $Ca^{2+}$, and $Zn^{2+}$.

* * * * *